(12) United States Patent
Iihoshi et al.

(10) Patent No.: US 7,266,942 B2
(45) Date of Patent: Sep. 11, 2007

(54) DIAGNOSTIC DEVICE AND METHOD OF ENGINE EXHAUST PURIFYING SYSTEM

(75) Inventors: Yoichi Iihoshi, Toyko (JP); Shinji Nakagawa, Tokyo (JP); Toshio Hori, Tokyo (JP); Yoshikuni Kurashima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 41 days.

(21) Appl. No.: 11/136,533

(22) Filed: May 25, 2005

(65) Prior Publication Data
US 2005/0262828 A1    Dec. 1, 2005

(30) Foreign Application Priority Data
May 26, 2004    (JP)    ............... 2004-155899

(51) Int. Cl.
*F01N 3/00* (2006.01)
*F01N 3/10* (2006.01)

(52) U.S. Cl. ............... 60/277; 60/285; 60/299; 60/302

(58) Field of Classification Search ......... 60/277, 60/285, 299, 302
See application file for complete search history.

(56) References Cited

U.S. PATENT DOCUMENTS

| | | | | |
|---|---|---|---|---|
| 3,938,075 | A * | 2/1976 | Reddy | ............ 340/438 |
| 5,444,977 | A * | 8/1995 | Kawabata | ............ 60/276 |
| 5,488,858 | A * | 2/1996 | Achleitner | ............ 73/118.1 |
| 5,610,321 | A * | 3/1997 | Shinmoto | ............ 73/23.32 |
| 5,819,195 | A * | 10/1998 | Iwata | ............ 701/103 |
| 6,439,038 | B1 * | 8/2002 | Rosel et al. | ............ 73/117.3 |
| 6,588,251 | B2 * | 7/2003 | Zhang et al. | ............ 73/23.32 |
| 6,880,328 | B2 * | 4/2005 | Daetz et al. | ............ 60/285 |
| 6,915,628 | B2 * | 7/2005 | Kamoto et al. | ............ 60/277 |

FOREIGN PATENT DOCUMENTS

| | | |
|---|---|---|
| JP | 07-259613 | 10/1995 |
| JP | 08-220051 | 8/1996 |
| JP | 2003-254142 | 10/2003 |

* cited by examiner

*Primary Examiner*—Thomas Denion
*Assistant Examiner*—Loren Edwards
(74) *Attorney, Agent, or Firm*—Crowell & Moring LLP

(57) ABSTRACT

A diagnostic device and method of an engine exhaust purifying system, which perform active control of an air-fuel ratio and can make diagnosis of air-fuel ratio sensors, catalysts, etc. in the engine exhaust purifying system with high accuracy and reliability while avoiding a worsening of exhaust emissions, an increase of revolution variations, etc. The diagnostic device comprises an exhaust air-fuel ratio control unit for performing control to keep an air-fuel ratio of exhaust gas flowing into a main catalyst near a stoichiometric ratio in accordance with outputs of downstream air-fuel ratio sensors, a rich/lean switching unit for switching over an air-fuel ratio in each of the cylinder groups to be rich or lean, thereby making diagnosis of each downstream air-fuel ratio sensor, a response detecting unit for detecting a response of the downstream air-fuel ratio sensor when the rich/lean switching of the air-fuel ratio in each cylinder group is performed, and a downstream sensor deterioration determining unit for determining a deterioration of the downstream air-fuel ratio sensor based on the detected response.

24 Claims, 27 Drawing Sheets

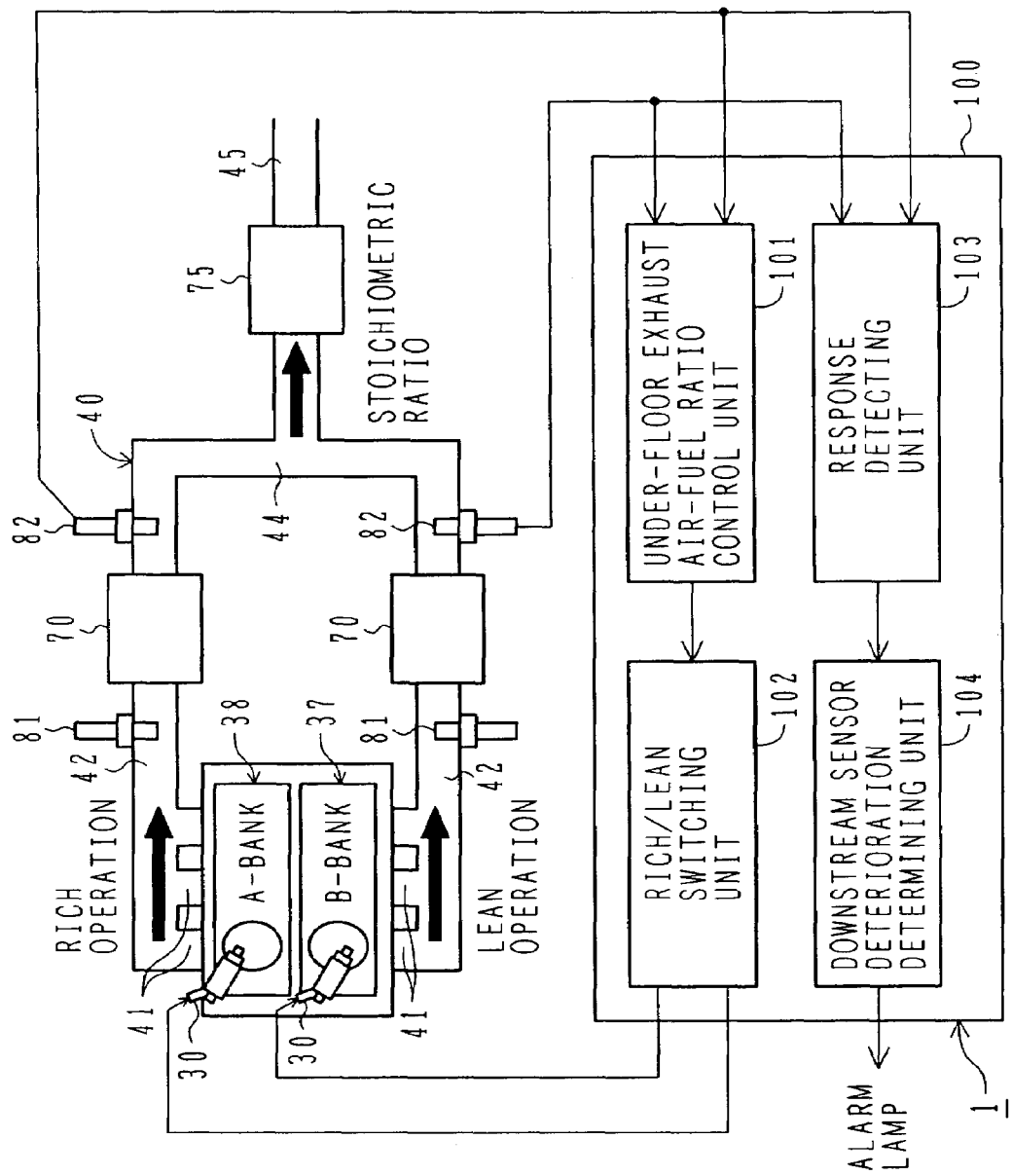

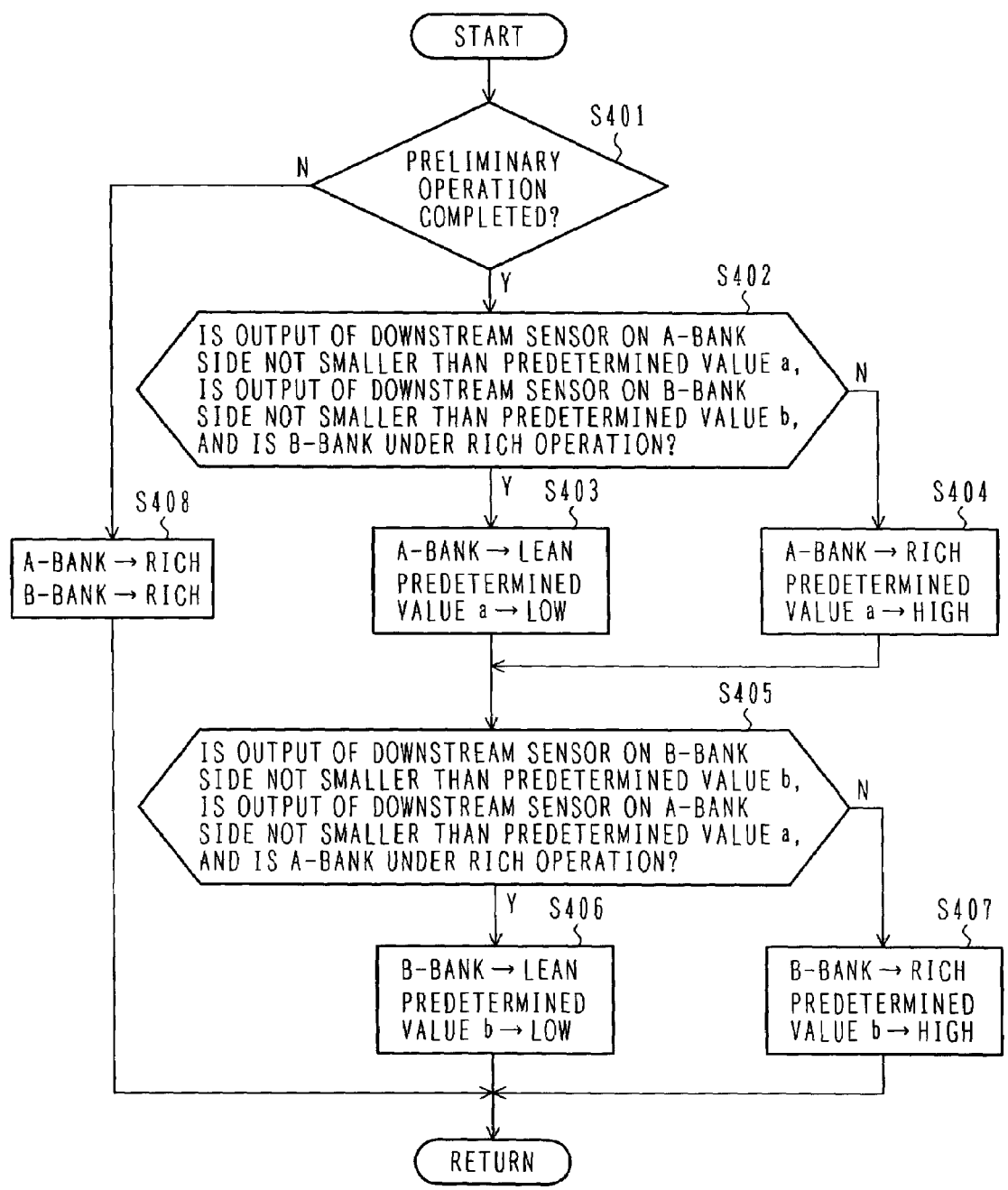

DIAGNOSTIC DEVICE AND METHOD OF ENGINE EXHAUST PURIFYING SYSTEM

BACKGROUND OF THE INVENTION

1. Field of the Invention

The present invention relates to a diagnostic device and method of an engine exhaust purifying system (such as air-fuel ratio sensors and catalysts) that includes a plurality of cylinder groups, a pre-catalyst made of a three-way catalyst and disposed in each of a plurality of upstream-side exhaust passage portions connected to the respective cylinder groups, a downstream air-fuel ratio sensor disposed downstream of each pre-catalyst, and a main catalyst made of a three-way catalyst and disposed in a downstream-side exhaust passage portion downstream of a merging area where the upstream-side exhaust passage portions are merged together.

2. Description of the Related Art

Hitherto, a technique of purifying exhaust gases with high efficiency by using a catalyst has been practiced by placing the catalyst in an engine exhaust passage, installing air-fuel ratio sensors for detecting respective exhaust components upstream and downstream of the catalyst, and modifying a fuel amount in accordance with outputs of the air-fuel ratio sensors. In such a case, because exhaust emissions depend on the purifying performance of the catalyst and the performance of the air-fuel ratio sensors, an exhaust purifying system diagnostic means for monitoring those performances is disposed in an engine control system. One proposed example of the diagnostic means is to passively make diagnosis (or determine deterioration) of an air-fuel ratio sensor disposed downstream of the catalyst in accordance with a sensor output (see, e.g., Patent Reference 1: JP,A 7-259613, pp. 1-8 and FIGS. 1-9). As another example, it is also proposed to control the air-fuel ratio (such as the fuel injection amount) for making diagnosis, and to actively diagnose the air-fuel ratio sensor and the catalyst (see, e.g., Patent Reference 2: JP,A 8-220051, pp. 1-10 and FIGS. 1-9, and Patent Reference 3: JP,A 2003-254142, pp. 1-9 and FIGS. 1-5).

SUMMARY OF THE INVENTION

In the passive diagnosis, however, a difficulty has increased in ensuring a required diagnosis frequency with an improvement in performance of the catalyst and the air-fuel ratio control. For that reason, diagnosis made by actively controlling the air-fuel ratio is expected to be predominant in future, but the active diagnosis causes new problems such as a reduction of the exhaust purifying performance (i.e., a worsening of exhaust emissions) and an increase of revolution variation.

Although Patent Reference 3 proposes a method capable of determining a deterioration of the catalyst while ensuring the exhaust purifying performance, this proposed method also cannot sufficiently overcome the above-mentioned problems in practice.

In view of the state of the art set forth above, it is an object of the present invention to provide a diagnostic device and method of an engine exhaust purifying system, which perform active control of an air-fuel ratio and can make diagnosis of air-fuel ratio sensors, catalysts, etc. in the engine exhaust purifying system with high accuracy and reliability while avoiding a worsening of exhaust emissions, an increase of revolution variation, etc.

To achieve the above object, the present invention provides, as a first form, a diagnostic device of an engine exhaust purifying system basically including a plurality of cylinder groups, a pre-catalyst made of a three-way catalyst and disposed in each of a plurality of upstream-side exhaust passage portions connected to the respective cylinder groups, a downstream air-fuel ratio sensor disposed downstream of each pre-catalyst, and a main catalyst made of a three-way catalyst and disposed in a downstream-side exhaust passage portion downstream of a merging area where the upstream-side exhaust passage portions are merged together, wherein the diagnostic device is particularly adapted for diagnosis of each downstream air-fuel ratio sensor and comprises an exhaust air-fuel ratio control unit for performing control to keep an air-fuel ratio of exhaust gas flowing into the main catalyst near a stoichiometric ratio in accordance with outputs of the downstream air-fuel ratio sensors; a rich/lean switching unit for switching over the air-fuel ratio in each cylinder group to be rich or lean in accordance with information obtained from the exhaust air-fuel ratio control unit, thereby making diagnosis of the downstream air-fuel ratio sensor; a response detecting unit for detecting a response of the downstream air-fuel ratio sensor when the rich/lean switching of the air-fuel ratio in each cylinder group is performed; and a downstream sensor deterioration determining unit for determining a deterioration of the downstream air-fuel ratio sensor based on the detected response.

With those features, since the air-fuel ratio of the exhaust gas flowing into the main catalyst is controlled to be kept near the stoichiometric ratio, the deterioration of the downstream air-fuel ratio sensor can be determined with high accuracy and reliability while avoiding a worsening of exhaust emissions.

To achieve the above object, the present invention provides, as a second form, a diagnostic device of an engine exhaust purifying system basically including a plurality of cylinder groups, a pre-catalyst made of a three-way catalyst and disposed in each of a plurality of upstream-side exhaust passage portions connected to the respective cylinder groups, a downstream air-fuel ratio sensor disposed downstream of each pre-catalyst, and a main catalyst made of a three-way catalyst and disposed in a downstream-side exhaust passage portion downstream of a merging area where the upstream-side exhaust passage portions are merged together, wherein the diagnostic device is particularly adapted for diagnosis of each pre-catalyst and comprises an exhaust air-fuel ratio control unit for performing control to keep an air-fuel ratio of exhaust gas flowing into the main catalyst near a stoichiometric ratio in accordance with outputs of the downstream air-fuel ratio sensors; a rich/lean switching unit for switching over the air-fuel ratio in each cylinder group to be rich or lean in accordance with information obtained from the exhaust air-fuel ratio control unit, thereby making diagnosis of the pre-catalyst; a response period detecting unit for detecting a response period of the downstream air-fuel ratio sensor or information related to the response period when the rich/lean switching of the air-fuel ratio in each cylinder group is performed; and a pre-catalyst deterioration determining unit for determining a deterioration of the pre-catalyst based on the detected response period or related information.

With those features, since the air-fuel ratio of the exhaust gas flowing into the main catalyst is controlled to be kept near the stoichiometric ratio, the deterioration of the pre-catalyst can be determined with high accuracy and reliability while avoiding a worsening of exhaust emissions.

To achieve the above object, the present invention provides, as a third form, a diagnostic device of an engine exhaust purifying system basically including a plurality of cylinder groups, a pre-catalyst made of a three-way catalyst and disposed in each of a plurality of upstream-side exhaust passage portions connected to the respective cylinder groups, an upstream air-fuel ratio sensor and a downstream air-fuel ratio sensor disposed respectively upstream and downstream of each pre-catalyst, and a main catalyst made of a three-way catalyst and disposed in a downstream-side exhaust passage portion downstream of a merging area where the upstream-side exhaust passage portions are merged together, wherein the diagnostic device is particularly adapted for diagnosis of each upstream air-fuel ratio sensor and comprises an exhaust air-fuel ratio control unit for performing control to keep an air-fuel ratio of exhaust gas flowing into the main catalyst near a stoichiometric ratio in accordance with outputs of the downstream air-fuel ratio sensors; a rich/lean switching unit for switching over the air-fuel ratio in each cylinder group to be rich or lean in accordance with information obtained from the exhaust air-fuel ratio control unit, thereby making diagnosis of the upstream air-fuel ratio sensor; a response detecting unit for detecting a response of the upstream air-fuel ratio sensor or information related to the response when the rich/lean switching of the air-fuel ratio in each cylinder group is performed; and an upstream sensor deterioration determining unit for determining a deterioration of the upstream air-fuel ratio sensor based on the detected response or related information.

With those features, since the air-fuel ratio of the exhaust gas flowing into the main catalyst is controlled to be kept near the stoichiometric ratio, the deterioration of the upstream air-fuel ratio sensor can be determined with high accuracy and reliability while avoiding a worsening of exhaust emissions.

Preferably, the first, second and third forms of the diagnostic device of the engine exhaust purifying system are constructed as follows.

The exhaust air-fuel ratio control unit preferably performs the air-fuel ratio control for each cylinder group such that the output of at least one of the downstream air-fuel ratio sensors becomes rich. With this feature, since the air-fuel ratio of the exhaust gas flowing into the main catalyst is controlled to be somewhat rich, an increase of the emission amount of NOx during the diagnosis can be suppressed.

In that case, preferably, the exhaust air-fuel ratio control unit controls the air-fuel ratios in all the cylinder groups to be temporarily rich at the start of diagnosis. With this feature, an increase of the emission amount of NOx at the start of the diagnosis can be suppressed.

In another preferred form, contrary to the above case, the exhaust air-fuel ratio control unit performs the air-fuel ratio control for each cylinder group such that the output of at least one of the downstream air-fuel ratio sensors becomes lean. With this feature, since the air-fuel ratio of the exhaust gas flowing into the main catalyst is controlled to be somewhat lean, an increase of the emission amount of HC and CO during the diagnosis can be suppressed.

In that case, preferably, the exhaust air-fuel ratio control unit controls the air-fuel ratios in all the cylinder groups to be temporarily lean at the start of diagnosis. With this feature, an increase of the emission amount of HC and CO at the start of the diagnosis can be suppressed.

The rich/lean switching unit preferably switches over the air-fuel ratio in each cylinder group to be rich or lean such that the output of the downstream air-fuel ratio sensor changes in excess of a predetermined value. By thus sufficiently changing the output of the downstream air-fuel ratio sensor, it is possible to reliably detect an abnormality (deterioration) of the downstream air-fuel ratio sensor and to further improve the diagnosis accuracy.

The rich/lean switching unit preferably modifies a fuel injection amount such that a response period from a point in time at which the output of the downstream air-fuel ratio sensor exceeds a predetermined value to a point in time at which the output exceeds the predetermined value again is held substantially at a predetermined time value (about several seconds).

With that feature, since the response period is held substantially at the predetermined time value (about several seconds), the time required for the diagnosis can be kept within an appropriate range and the diagnosis frequency can be ensured at a sufficiently satisfactory level.

The rich/lean switching unit preferably modifies a fuel injection amount such that a difference between the rich and lean air-fuel ratios in each cylinder group falls within a predetermined range (2 to 0.8).

By thus controlling an air-fuel ratio width so as to fall within the predetermined range, the deterioration determination can be performed with high accuracy and reliability while avoiding an influence upon the revolution variation.

In the first form of the diagnostic device of the engine exhaust purifying system, preferably, the response detecting unit detects at least one of a response time required for the output of the downstream air-fuel ratio sensor to change from a first predetermined value to a second predetermined value and a response time for the output to change from the second predetermined value to the first predetermined value.

In that case, the downstream sensor deterioration determining unit in the first form preferably determines that the downstream air-fuel ratio sensor has deteriorated, when the detected response time is not smaller than a predetermined value set depending on engine operating status.

By thus comparing the detected response time with the predetermined value (threshold) set depending on the engine operating status, the deterioration of the downstream air-fuel ratio sensor can be determined with high accuracy over a wider range.

The response period detecting unit in the second unit preferably detects a response period (response time) from a point in time at which the output of the downstream air-fuel ratio sensor exceeds a predetermined value to a point in time at which the output exceeds the predetermined value again. In this case, the pre-catalyst deterioration determining unit preferably determines that the pre-catalyst has deteriorated, when the detected response period is not larger than a predetermined value set depending on engine operating status.

With that feature, the oxygen storage capability of the catalyst can be measured (estimated) in consideration of the engine operating status as well, and therefore the deterioration of the pre-catalyst can be determined with high accuracy.

More preferably, the pre-catalyst deterioration determining unit determines that the pre-catalyst has deteriorated, when a modified response period resulting by excluding the response time of the downstream air-fuel ratio sensor from the detected response period is not larger than a predetermined value set depending on engine operating status.

With that feature, the deterioration of the pre-catalyst can be determined with higher accuracy without being affected by response characteristics of the downstream air-fuel ratio sensor.

As an alternative, in the second form, when the rich/lean switching unit modifies a fuel injection amount such that a response period from a point in time at which the output of the downstream air-fuel ratio sensor exceeds a predetermined value to a point in time at which the output exceeds the predetermined value again is held substantially at a predetermined time value (about several seconds), the pre-catalyst deterioration determining unit determines that the pre-catalyst has deteriorated, when a modification amount of the fuel injection amount as information related to the response period is not larger than a predetermined value set depending on engine operating status.

With that feature, the time required for the diagnosis can be kept within an appropriate range and the diagnosis frequency can be ensured at a sufficiently satisfactory level.

On the other hand, in the third form of the diagnostic device, the response detecting unit preferably detects at least one of a response time required for an output of the upstream air-fuel ratio sensor to change from a first predetermined value to a second predetermined value and a response time required for the output to change from the second predetermined value to the first predetermined value.

In that case, the upstream sensor deterioration determining unit in the third form preferably determines that the upstream air-fuel ratio sensor has deteriorated, when the detected response time is not smaller than a predetermined value set depending on engine operating status.

By thus comparing the detected response time with the predetermined value (threshold) set depending on the engine operating status, the deterioration of the upstream air-fuel ratio sensor can be determined with high accuracy over a wider range.

In another preferred example of the third form, the rich/lean switching unit performs air-fuel ratio feedback control in accordance with an output of the upstream air-fuel ratio sensor, and the upstream sensor deterioration determining unit determines that the upstream air-fuel ratio sensor has deteriorated, when a fuel modification amount during the rich/lean switching operation is not smaller than a predetermined value set depending on engine operating status.

By thus employing the fuel modification amount during the rich or lean operation under the air-fuel ratio feedback control in consideration of the engine operating status as well, the deterioration of the upstream air-fuel ratio sensor can be determined with high accuracy.

In another preferred form of the diagnostic device of the engine exhaust purifying system according to the present invention, the diagnostic device further comprises a revolution variation detecting unit, and the rich/lean switching unit reduces a difference between rich and lean air-fuel ratios when the revolution variation detected by the revolution variation detecting unit is not smaller than a predetermined value.

With that feature, the air-fuel ratio sensors and the catalysts, which constitute the engine exhaust purifying system, can be diagnosed while surely avoiding an influence upon the revolution variation.

Further, the deterioration determination is stopped when the response time or the response period is longer than a predetermined value.

By thus stopping the diagnosis when the response time or the response period is too long, it is possible to suppress a deterioration of the diagnosis accuracy caused by change of the engine operating status.

In addition, the present invention provides, as a first mode, a diagnostic method of an engine exhaust purifying system including a plurality of cylinder groups, a pre-catalyst made of a three-way catalyst and disposed in each of a plurality of upstream-side exhaust passage portions connected to the respective cylinder groups, a downstream air-fuel ratio sensor disposed downstream of each pre-catalyst, and a main catalyst made of a three-way catalyst and disposed in a downstream-side exhaust passage portion downstream of a merging area where the upstream-side exhaust passage portions are merged together, wherein the diagnostic method is particularly adapted for diagnosis of each downstream air-fuel ratio sensor and comprises the steps of, in the diagnosis of the downstream air-fuel ratio sensor, performing air-fuel ratio control to keep an air-fuel ratio of exhaust gas flowing into the main catalyst near a stoichiometric ratio in accordance with outputs of the downstream air-fuel ratio sensors; switching over the air-fuel ratio in each cylinder group to be rich or lean in accordance with information obtained from the air-fuel ratio control, thereby detecting a response of the downstream air-fuel ratio sensor; and determining a deterioration of the downstream air-fuel ratio sensor based on the detected response.

Also, the present invention provides, as a second mode, a diagnostic method of an engine exhaust purifying system including a plurality of cylinder groups, a pre-catalyst made of a three-way catalyst and disposed in each of a plurality of upstream-side exhaust passage portions connected to the respective cylinder groups, a downstream air-fuel ratio sensor disposed downstream of each pre-catalyst, and a main catalyst made of a three-way catalyst and disposed in a downstream-side exhaust passage portion downstream of a merging area where the upstream-side exhaust passage portions are merged together, wherein the diagnostic method is particularly adapted for diagnosis of each pre-catalyst and comprises the steps of, in the diagnosis of the pre-catalyst, performing air-fuel ratio control to keep an air-fuel ratio of exhaust gas flowing into the main catalyst near a stoichiometric ratio in accordance with outputs of the downstream air-fuel ratio sensors; switching over the air-fuel ratio in each cylinder group to be rich or lean in accordance with information obtained from the air-fuel ratio control, thereby detecting a response period of the downstream air-fuel ratio sensor or information related to the response period; and determining a deterioration of the pre-catalyst based on the detected response or related information.

Further, the present invention provides, as a third mode, a diagnostic method of an engine exhaust purifying system including a plurality of cylinder groups, a pre-catalyst made of a three-way catalyst and disposed in each of a plurality of upstream-side exhaust passage portions connected to the respective cylinder groups, an upstream air-fuel ratio sensor and a downstream air-fuel ratio sensor disposed respectively upstream and downstream of each pre-catalyst, and a main catalyst made of a three-way catalyst and disposed in a downstream-side exhaust passage portion downstream of a merging area where the upstream-side exhaust passage portions are merged together, wherein the diagnostic method is particularly adapted for diagnosis of each upstream air-fuel ratio sensor and comprises the steps of, in the diagnosis of the upstream air-fuel ratio sensor, performing air-fuel ratio control to keep an air-fuel ratio of exhaust gas flowing into the main catalyst near a stoichiometric ratio in accordance with outputs of the downstream air-fuel ratio sensors; switching over the air-fuel ratio in each cylinder group to be rich or lean in accordance with information obtained from the air-fuel ratio control, thereby detecting a response of the upstream air-fuel ratio sensor or information related to the response; and determining a deterioration of the upstream air-fuel ratio sensor based on the detected response or related information.

With the diagnostic device and method of the engine exhaust purifying system according to the present invention, since the air-fuel ratio sensors and the catalysts, which constitute the engine exhaust purifying system, can be diagnosed in an active way, it is possible to ensure the diagnosis frequency and the diagnosis accuracy at sufficiently satisfactory levels, and to prevent a worsening of exhaust emissions and an influence upon the revolution variation. Moreover, since an abnormality (deterioration) for each of the downstream air-fuel ratio sensor, the pre-catalyst, and the upstream air-fuel ratio sensor can be individually determined in one process of diagnosis, efficient diagnosis can be realized.

BRIEF DESCRIPTION OF THE DRAWINGS

FIG. 2 is a schematic view showing the diagnostic device of the engine exhaust purifying system according to the first embodiment of the present invention, the view being limited to a section that takes part in diagnosis of the engine exhaust purifying system;

FIG. 3 shows examples of air-fuel ratio sensor characteristics, in which

FIG. 4 is a flowchart showing one example of a rich/lean switching routine used in diagnosis of downstream air-fuel ratio sensors, which is executed by a control unit;

FIG. 18 shows examples of setting a threshold b, in which

DESCRIPTION OF THE PREFERRED EMBODIMENTS

Embodiments of the present invention will be described below with reference to the drawings.

First Embodiment

Diagnosis of Downstream Air-Fuel Ratio Sensors

Figure 1:
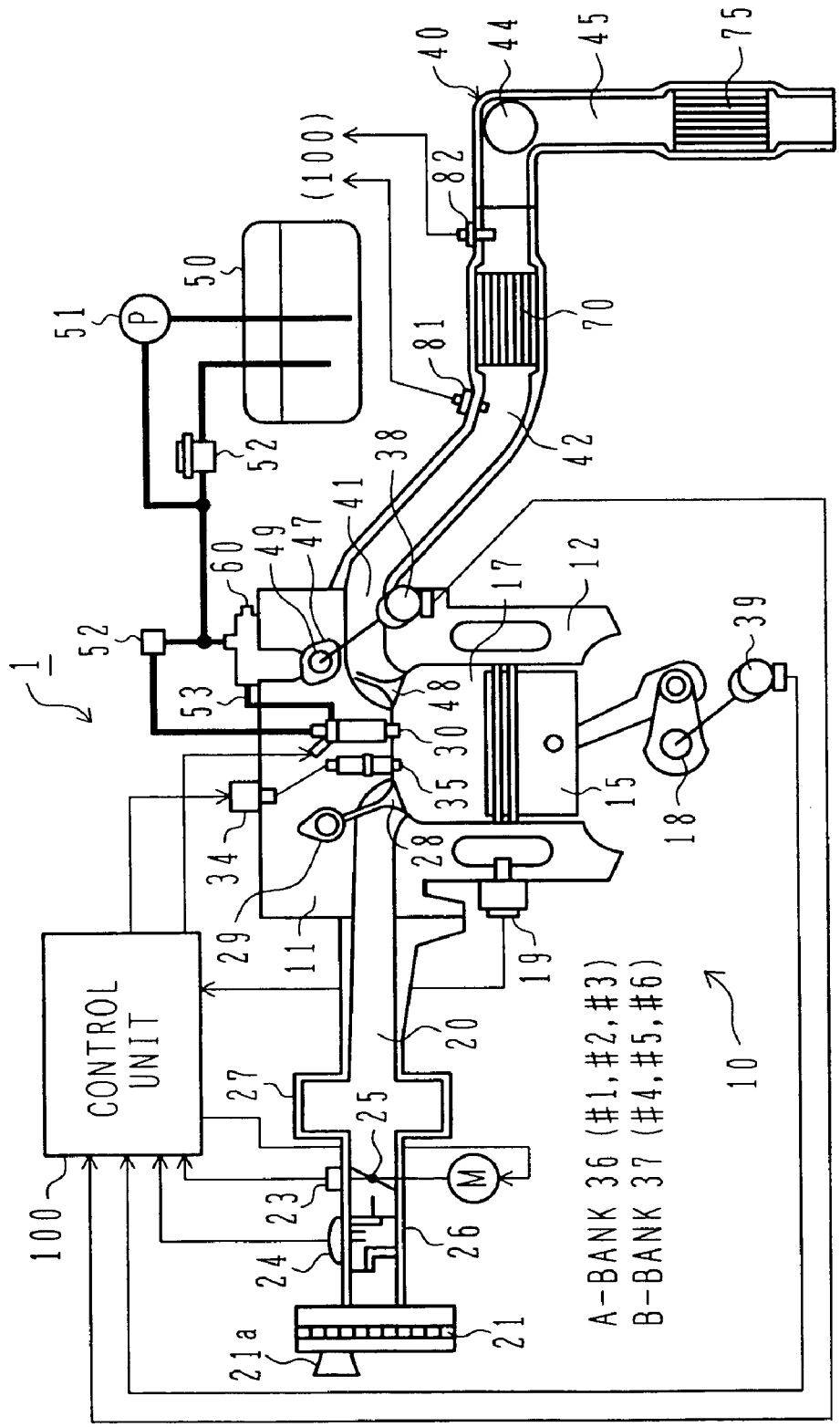
FIG. 1 is a schematic view showing a diagnostic device of an engine exhaust purifying system according to a first embodiment of the present invention, along with one example of a vehicle-loaded direct injection engine to which the diagnostic device is applied.

FIG. 1 is a schematic view showing a diagnostic device 1 of an engine exhaust purifying system according to a first embodiment of the present invention, along with one example of a vehicle-loaded direct injection engine to which the diagnostic device is applied. While FIG. 1 shows only one cylinder, an engine 10 to which this embodiment is applied is, for example, a V-type 6-cylinder engine equipped with an A bank 36 and a B bank 37 including respective cylinder groups each comprising three cylinders (#1, #2 and #3 or #4, #5 and #6), as seen from FIG. 2 which is a schematic view showing the diagnostic device of the engine exhaust purifying system according to the first embodiment of the present invention, the view being limited to a section that takes part in diagnosis of the engine exhaust purifying system. The engine 1 comprises two groups of cylinder heads 11 and cylinder blocks 12, which constitute the banks 36, 37, with pistons 15 slidably inserted in the cylinder blocks 12 (i.e., the cylinders #1 to #6). A combustion chamber 17 is defined above each of the pistons 15. An ignition plug 35 supplied with a high voltage from an ignition coil 34 and a fuel injection valve 30 for directly injecting fuel into the combustion chamber 17 are disposed so as to face the combustion chamber 17. Note that, although the ignition plug 35 and the fuel injection valve 30 are shown in FIG. 1 as being positioned side by side in a top portion of the combustion chamber 17 for the sake of convenience in drawing, layout of them can be optionally set as appropriate. Also, in FIG. 2, only one cylinder and only one fuel injection valve 30 are shown for each of the A bank 36 and the B bank 37, while the other cylinders and fuel injection valves are omitted (for the sake of simplicity of the drawing).

Air supplied for combustion of fuel is taken in through an inlet 21a of an air cleaner 21 disposed at a start end of an intake passage 20, passes through an airflow sensor 24, and then enters a collector 27 through a throttle body 26 in which an electrically controlled throttle valve 25 is installed. Then, the air is introduced from the collector 27 into the combustion chamber 17 of each of the cylinders #1 to #6 through a branched passage forming a downstream portion of the intake passage 20 and an intake valve 28 that is disposed at a downstream end of the branched passage and is driven by an intake camshaft 29 so as to open and close.

An air-fuel mixture of the air taken into the combustion chamber 17 and the fuel injected to it from the fuel injection valve 30 is ignited by the ignition plug 35 for combustion and explosion. Resulting combustion waste gas (exhaust gas) is discharged to an exhaust passage 40, as described later in detail, through an exhaust valve 48 which is driven by an exhaust camshaft 49 so as to open and close. Then, the exhaust gas is discharged to the exterior after being purified by pre-catalysts 70, 70 disposed in the exhaust passage 40 and an under-floor catalyst 75 (called so because it is generally disposed under a vehicle floor) which serves as a main catalyst.

The fuel, such as gasoline, injected from the fuel injection valve 30, is supplied from a fuel tank 50 while being primarily pressurized by a low-pressure fuel pump 51 and regulated to a certain pressure (e.g., 3 kg/cm$^2$) by a fuel pressure regulator 52. Further, the fuel is secondarily pressurized to a higher-pressure level (e.g., 50 kg/cm$^2$) by a high-pressure fuel pump 60, which is driven by a pump driving cam 47 fitted over an exhaust camshaft 49, for feeding to a fuel accumulator (common rail) 53 under high pressure. From the fuel accumulator 53, the fuel is supplied to the fuel injection valve 30 provided for each of the cylinders #1 to #6.

In this embodiment, the exhaust passage 40 is made up of two upstream-side exhaust passage portions 42, 42 each connected to the corresponding cylinder group (#1, #2 and #3 or #4, #5 and #6) of the bank 36, 37 through individual exhaust passage portions 41, 41 and 41, and a downstream-side exhaust passage portion 45 downstream of a merging area 44 where the two upstream-side exhaust passage portions 42, 42 are merged together. The pre-catalyst 70 made of a three-way catalyst is disposed in each of the upstream-side exhaust passage portions 42, 42. An upstream air-fuel ratio sensor 81 used for air-fuel ratio control, etc. in a normal state is disposed upstream of the pre-catalyst 70 in each of the upstream-side exhaust passage portions 42, 42, and a downstream air-fuel ratio sensor 82 used for diagnosis of the engine exhaust purifying system is disposed downstream of the pre-catalyst 70 in each of the upstream-side exhaust passage portions 42, 42. The under-floor catalyst (main catalyst) 75 made of a three-way catalyst is disposed in the downstream-side exhaust passage portion 45 downstream of the merging area 44 where the upstream-side exhaust passage portions 42, 42 are merged together.

Further, in this embodiment, a control unit 100 is provided which incorporates a microcomputer and performs the diagnosis of the engine exhaust purifying system in addition to control of the ignition timing of the engine 10, the fuel injection amount (air-fuel ratio), etc.

The control unit 100 basically comprises, as well known in the art, an MPU, an EP-ROM, a RAM, an I/O LSI including an A/D converter, and so on. Input signals supplied to the control unit 100 include, e.g., a signal corresponding to the intake air amount detected by the airflow sensor 24, a signal corresponding to the opening degree of the throttle valve 25 detected by a throttle sensor 23, a detected signal of the phase (rotational position) of the exhaust camshaft 49 from a cam angle sensor 38, a detected signal of the rotational angle/phase (rotational position) of the crankshaft 18 from a crank angle sensor 39, signals corresponding to, e.g., the oxygen concentrations in the exhaust gas detected by the upstream air-fuel ratio sensor 81 and the downstream air-fuel ratio sensor 82 which are disposed in each of the upstream-side exhaust passage portions 42, 42, and a signal corresponding to the temperature of engine cooling water, which is detected by a water temperature sensor 19 disposed on the cylinder block 12.

The control unit 100 takes in the above-mentioned signals at a predetermined period and executes predetermined arithmetic and logical processing. Then, the control unit 100 supplies control signals computed with the processing to the fuel injection valves 30, the ignition coils 34, the electrically controlled throttle valves 25, etc. associated with the respective cylinders, to thereby perform fuel injection (injection amount and injection timing) control, ignition timing control, fuel pressure control, opening degree control of each throttle valve 25, etc. and to make diagnosis of the engine exhaust purifying system as appropriate.

In this embodiment, the diagnosis of the engine exhaust purifying system is performed as diagnosis (deterioration determination) of the downstream air-fuel ratio sensors 82, 82. This diagnosis will be described below with reference to FIGS. 2 to 15.

As shown in FIG. 2 illustrating a functional block diagram representative of the case where the diagnosis of each downstream air-fuel ratio sensor 82 is performed, the control unit 100 comprises an under-floor exhaust air-fuel ratio control unit 101 for performing control to keep the air-fuel ratio of the exhaust gas flowing into the under-floor catalyst 75 near a stoichiometric ratio in accordance with outputs of the downstream air-fuel ratio sensors 82, 82, a rich/lean switching unit 102 for switching over the air-fuel ratio in each of the cylinder group of the A bank 36 and the cylinder group of the B bank 37 to be rich or lean in accordance with information obtained from the under-floor exhaust air-fuel ratio control unit 101, thereby making the diagnosis of the downstream air-fuel ratio sensors 82, 82, a response detecting unit 103 for detecting a response of each of the downstream air-fuel ratio sensors 82, 82 when the rich/lean switching of the air-fuel ratio in each cylinder group is performed, and a downstream sensor deterioration determining unit 104 for determining a deterioration of each of the downstream air-fuel ratio sensors 82, 82 based on the detected response. If a deterioration of any of the downstream air-fuel ratio sensors 82, 82 is determined, an alarm lamp is turned on.

Stated another way, the control unit 100 actively controls the fuel injection amounts from the fuel injection valves 30 associated with the respective cylinder groups of the A bank 36 and the B bank 37 such that the cylinder groups are each alternately subjected to the rich operation and the lean operation, thereby detecting the response of each of the downstream air-fuel ratio sensors 82, 82. Then, the control unit 100 determines a deterioration of each of the downstream air-fuel ratio sensors 82, 82 based on the detected response.

Details of such diagnosis of the downstream air-fuel ratio sensors 82, 82 will be described below, including the fact as the premise for the diagnosis and reviews based on the premise.

Figure 3A:
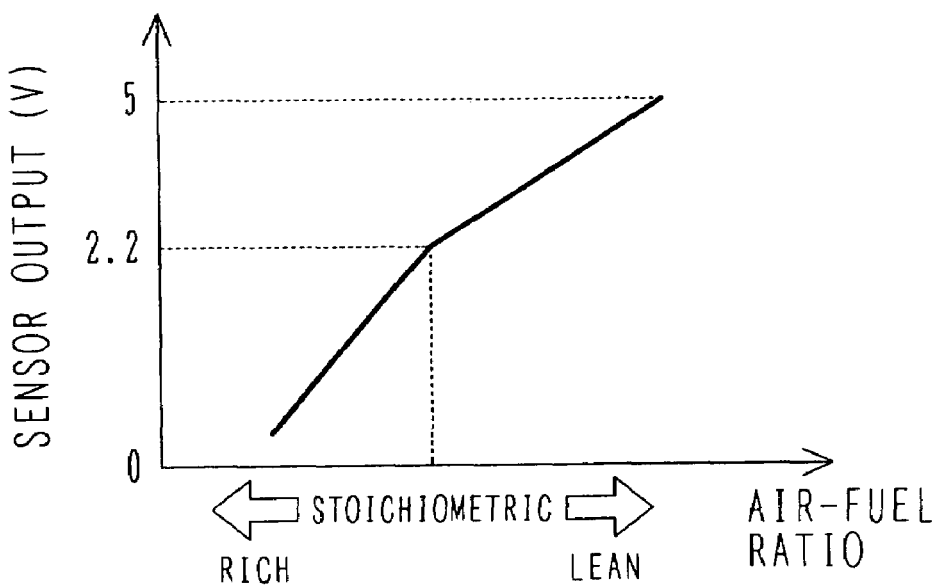
FIG. 3A is a graph showing characteristics of a linear air-fuel ratio sensor (LAF sensor) that outputs a linear voltage with a stoichiometric ratio being as the center.
Figure 3B:
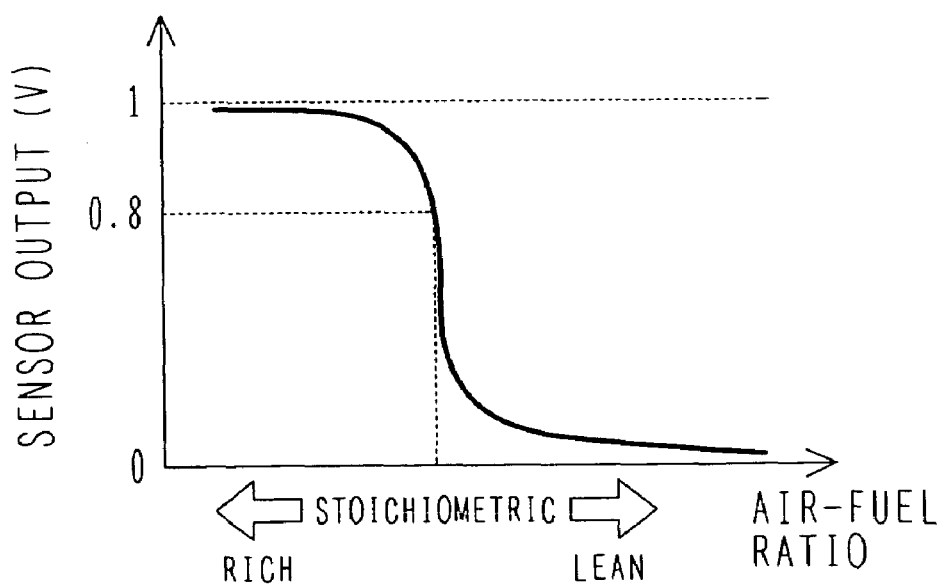
FIG. 3B is a graph showing characteristics of an air-fuel ratio sensor ($O_2$ sensor) producing an output that is changed in a switching manner with a stoichiometric ratio being as the center.

FIG. 3 shows examples of air-fuel ratio sensor characteristics. Specifically, FIG. 3A is a graph showing characteristics of a linear air-fuel ratio sensor (LAF sensor) that outputs a linear voltage with a stoichiometric ratio being as the center, and FIG. 3B is a graph showing characteristics of an air-fuel ratio sensor ($O_2$ sensor) producing an output that is changed in a switching manner with a stoichiometric ratio being as the center. In the following description, unless otherwise specified, it is assumed that the upstream air-fuel ratio sensors 81, 81 are LAF sensors and the downstream air-fuel ratio sensors 82, 82 are $O_2$ sensors. As a matter of course, however, the present invention is not limited to such a case.

FIG. 4 is a flowchart showing one example of a rich/lean switching routine used in the diagnosis of downstream air-fuel ratio sensors 82, 82, which is executed by the control unit 100. The diagnosis is performed on condition that the engine is under the steady operation and the under-floor catalyst 75 is activated. When passive diagnosis is also performed in a combined manner, the active diagnosis may be performed only if a normal result could not been obtained with determination of the passive diagnosis. When those conditions are satisfied, both (the cylinder groups of) the A bank 36 and the B bank 37 are temporarily brought into the rich operation at the start of the diagnosis (as described later).

First, in step S401, it is determined whether the preliminary operation at the start of the diagnosis is completed. If the preliminary operation is completed, the control flow proceeds to step S402, and if not completed, it proceeds to step S408. In step S408, since the preliminary operation is not completed, both (the cylinder groups of) the A bank 36 and the B bank 37 are brought into the rich operation.

On the other hand, in step S402 to which the control flow proceeds if the preliminary operation is completed, it is determined whether the output of the downstream air-fuel ratio sensor 82 on the A bank 36 side is not smaller than a predetermined value a, whether the output of the downstream air-fuel ratio sensor 82 on the B bank 37 side is not smaller than a predetermined value b, and whether the B bank 37 is under the rich operation. If those conditions are satisfied, the control flow proceeds to step S403 in which the A bank 36 is brought into the lean operation and the predetermined value a is switched over to a low level (about 0.2 V). If those conditions are not satisfied, the control flow proceeds to step S404 in which the A bank 36 is brought into the rich operation and the predetermined value a is switched over to a high level (about 0.6 V).

In next step S405, it is determined whether the output of the downstream air-fuel ratio sensor 82 on the B bank 37 side is not smaller than the predetermined value b, whether the output of the downstream air-fuel ratio sensor 82 on the A bank 36 side is not smaller than the predetermined value a, and whether the A bank 36 is under the rich operation. If those conditions are satisfied, the control flow proceeds to step S406 in which the B bank 37 is brought into the lean operation and the predetermined value b is switched over to a low level (about 0.2 V). If those conditions are not satisfied, the control flow proceeds to step S407 in which the B bank 37 is brought into the rich operation and the predetermined value b is switched over to a high level (about 0.6 V).

Figure 5:
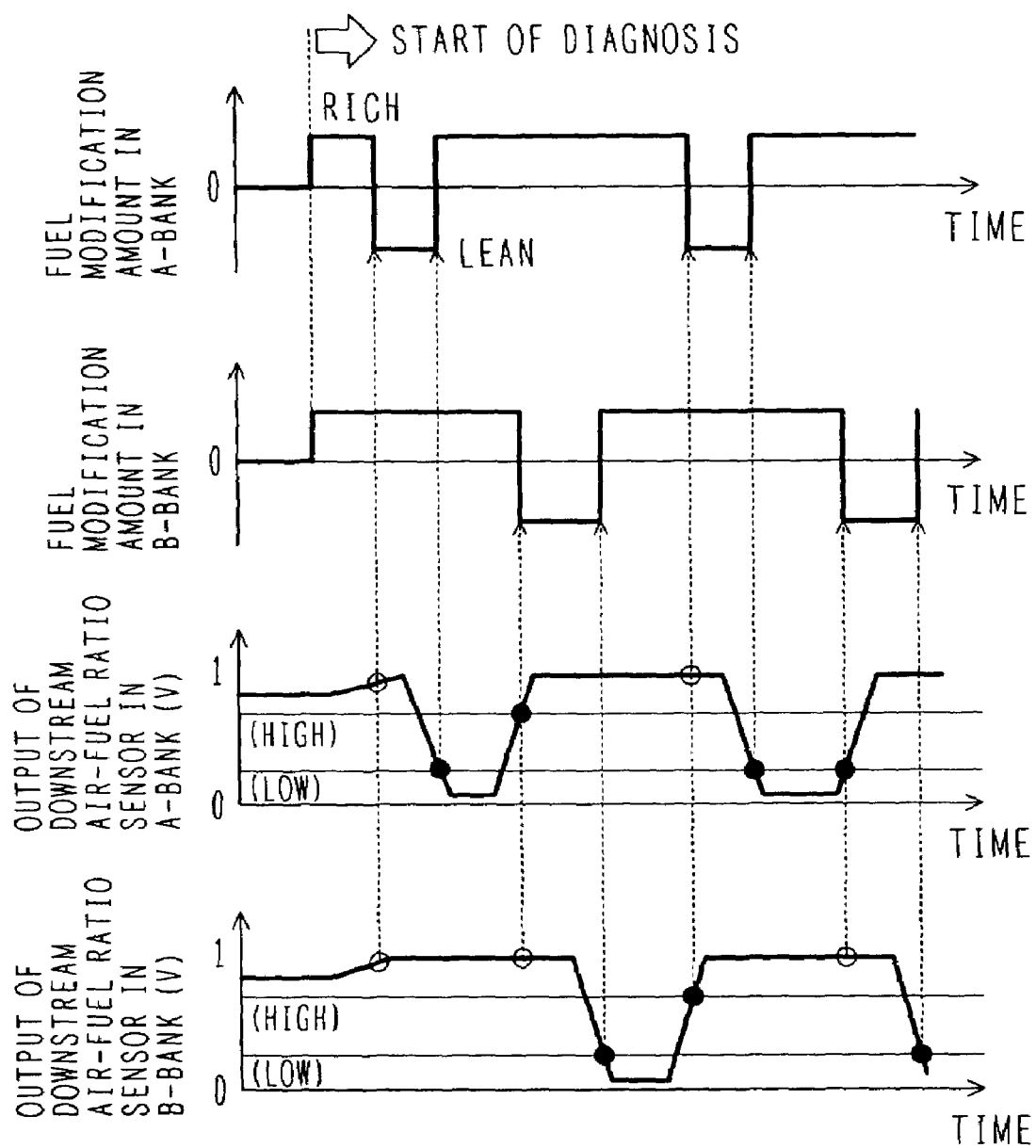
FIG. 5 is a set of charts showing fuel modification amounts in respective banks and outputs of the downstream air-fuel ratio sensors when the rich/lean switching routine shown in FIG. 4 is executed.

FIG. 5 is a set of charts showing the fuel modification amounts (i.e., the amounts by which the fuel injection amounts are modified) in the respective banks 36, 37 and the outputs of the downstream air-fuel ratio sensors 82, 82 when the rich/lean switching routine shown in FIG. 4 is executed. The term "fuel modification amount" means the modification amount on an assumption of setting, to a reference of 0, the fuel injection amount resulting when the fuel is injected so that the air-fuel ratio in each of the banks 36, 37 is a stoichiometric ratio. If the fuel modification amount is larger than the reference, it represents the rich operation, and if the fuel modification amount is smaller than the reference, it represents the lean operation. Whether the fuel modification amount is larger or smaller than the reference can be confirmed by checking whether the output of corresponding one of the upstream air-fuel ratio sensors 81, 81 takes a value in the rich or lean state. As an alternative, if the width of a fuel injection pulse is longer than a reference that is defined by the pulse width before execution of the diagnosis, this can be regarded as representing the rich operation, and if it is shorter than the reference, this can be regarded as representing the lean operation.

In this example, both the A and B banks 36, 37 are temporarily brought into the rich operation at the same time as the start of the diagnosis. This step is intended to prevent leakage of NOx from the under-floor catalyst 75 immediately after the start of the diagnosis, namely to reduce the emission amount of NOx to the exterior. By reducing the oxygen storage amount of the under-floor catalyst 75, it is possible to purify NOx even when the exhaust gas at an inlet of the under-floor catalyst 75 (i.e., the under-floor exhaust gas) becomes somewhat lean. Subsequently, when the outputs of the downstream air-fuel ratio sensors 82, 82 in both the A and B banks 36, 37 are increased to be not smaller than a predetermined value, the A bank 36 is brought into the lean operation. Responsively, the output of the downstream air-fuel ratio sensor 82 on the A bank 36 side is gradually changed to take a value in the lean state while undergoing influences of the dead time caused by a lag in air transfer and the dynamics of oxygen storage capability of the pre-catalyst 70. Then, when the output of the downstream air-fuel ratio sensor 82 on the A bank 36 side is decreased to be not larger than the predetermined value a (low), the A bank 36 is brought into the rich operation. Responsively, the output of the downstream air-fuel ratio sensor 82 on the A bank 36 side is gradually changed to take a value in the rich state while undergoing the influences of the dead time and the dynamics, mentioned above, in a reversed way to the above case. When the output of the downstream air-fuel ratio sensor 82 on the A bank 36 side is increased to be not smaller than the predetermined value a (high), the B bank 37 is now brought into the lean operation. Responsively, as in the case of the A bank 36, the output of the downstream air-fuel ratio sensor 82 on the B bank 37 side is gradually changed to take a value in the lean state while undergoing influences of the dead time caused by a lag in air transfer and the dynamics of oxygen storage capability of the pre-catalyst 70. Then, when the output of the downstream air-fuel ratio sensor 82 on the B bank 37 side is decreased to be not larger than the predetermined value b (low), the B bank 37 is brought into the rich operation. Responsively, the output of the downstream air-fuel ratio sensor 82 on the B bank 37 side is gradually changed to take a value in the rich state. When the output of the downstream air-fuel ratio sensor 82 on the B bank 37 side is increased to be not smaller than the predetermined value b (high), the A bank 36 is brought again into the lean operation.

In this example, by repeating a series of the above-described operations at least once more, the outputs of the downstream air-fuel ratio sensors 82, 82 in both the A and B banks 36, 37 are varied in excess of the respective predetermined values to be able to detect deteriorations of the downstream air-fuel ratio sensors 82, 82 (as described later). Also, by performing control in such a manner as making the sum of the fuel modification amounts zero (0) when one of the A and B banks 36, 37 is brought into the rich operation and the other is brought into the lean operation, the under-floor exhaust gas is held nearly at the stoichiometric ratio even during the diagnosis, and the exhaust gas is effectively purified by the under-floor catalyst 75. As a result, a worsening of exhaust emissions can be avoided. Furthermore, the rich-lean amplitude (i.e., the difference between the rich air-fuel ratio and the lean air-fuel ratio) resulting from the fuel modification is preferably set to be in a predetermined range of, e.g., about 2 to 0.8 from the viewpoint of preventing an increase of revolution variation. The rich-lean amplitude can be set to a larger value as the revolution speed increases. Additionally, the active diagnosis may be inhibited during idling to avoid the revolution variation. Within the aforesaid predetermined range, the fuel modification amounts may be set so as to provide a response period of several seconds from the viewpoint of ensuring a satisfactory diagnosis frequency.

Figure 6:
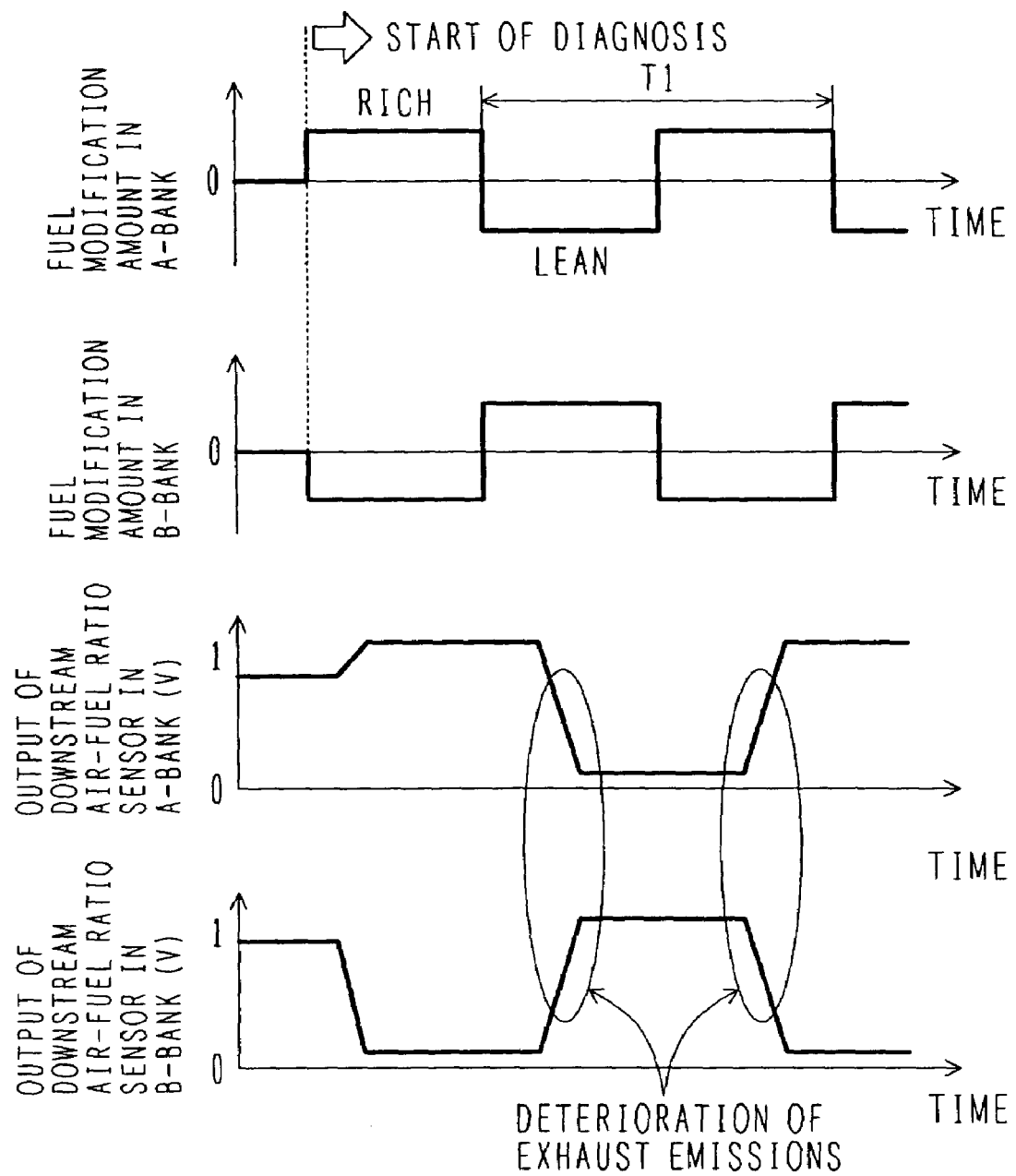
FIG. 6 is a set of charts showing the fuel modification amounts in the respective banks and the outputs of the downstream air-fuel ratio sensors when a rich/lean operation is performed without referring to the outputs of the downstream air-fuel ratio sensors.

FIG. 6 is a set of charts showing an example in which the A and B banks 36, 37 are alternately brought into the rich and lean operations at a period T1 without referring to the outputs of the downstream air-fuel ratio sensors 82, 82 downstream of the pre-catalysts 70. With this example, the air-fuel ratio of the under-floor exhaust gas cannot be controlled satisfactorily, thus resulting in that the amount of emissions such as NOx is increased and the exhaust emissions are deteriorated in regions where characteristic lines representing the outputs of the downstream air-fuel ratio sensors 82, 82 cross each other. In contrast, with the method of this example shown in FIGS. 4 and 5, since the air-fuel ratio of the under-floor exhaust gas is controlled in accordance with the outputs of the downstream air-fuel ratio sensors 82, 82, the deterioration of exhaust emissions can be avoided.

Figure 7:
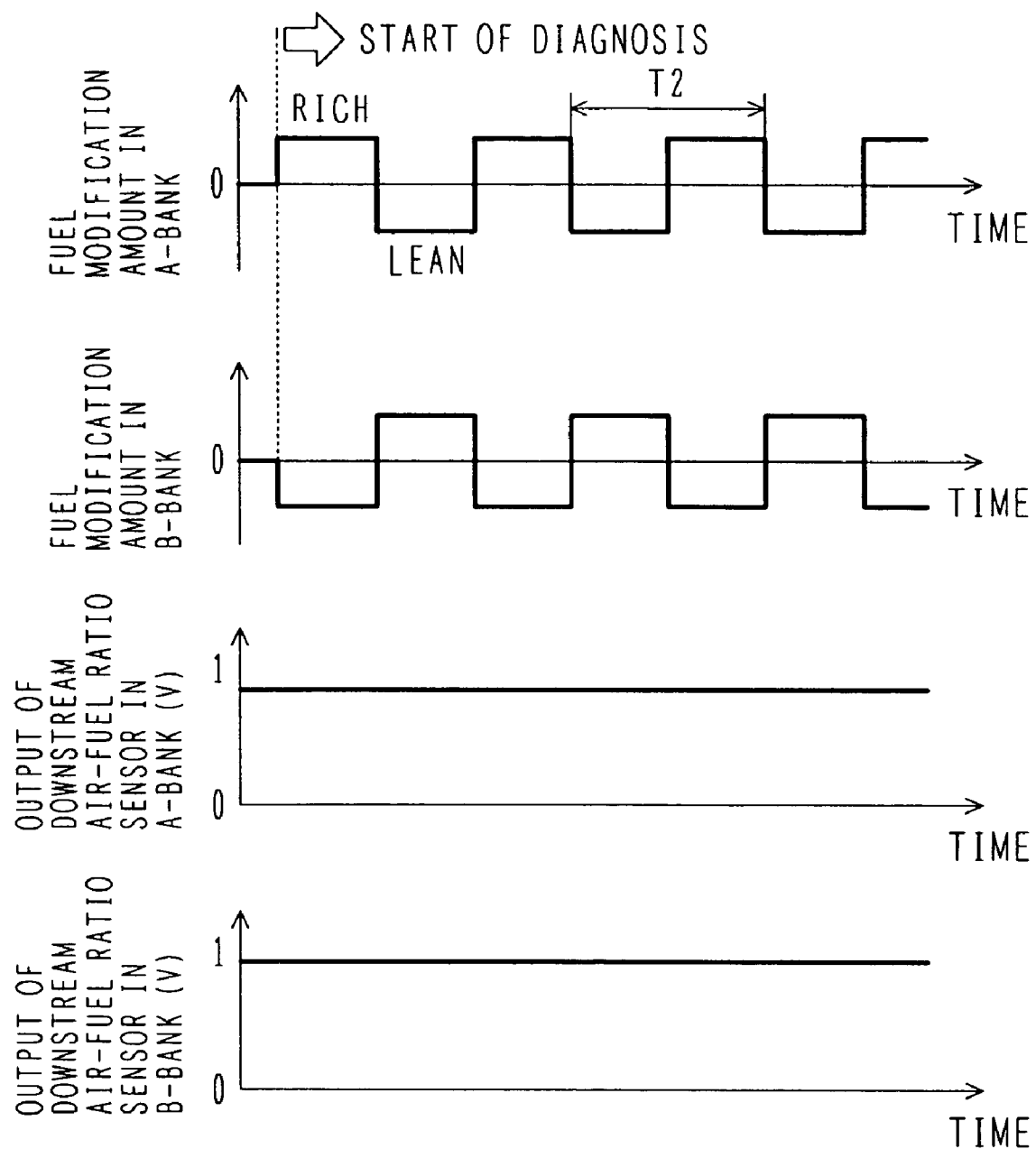
FIG. 7 is a set of charts showing the fuel modification amounts in the respective banks and the outputs of the downstream air-fuel ratio sensors when deteriorations of the downstream air-fuel ratio sensors cannot be detected because of a period T2 being too short.

FIG. 7 is a set of charts showing a comparative example in which the outputs of the downstream air-fuel ratio sensors 82, 82 are not referred to as in the case of FIG. 6 and the deterioration of the downstream air-fuel ratio sensors 82, 82 cannot be detected because of a period T2 being too short. With this comparative example, the outputs of the downstream air-fuel ratio sensors 82, 82 show no responses due to the oxygen storage capability of each pre-catalyst 70, and the deterioration of the downstream air-fuel ratio sensors 82, 82 cannot be determined. This means that, to make the diagnosis of the downstream air-fuel ratio sensors 82, 82 with reliability, it is essential to perform the rich/lean switching operation in accordance with the outputs of the downstream air-fuel ratio sensors 82, 82.

Figure 8:
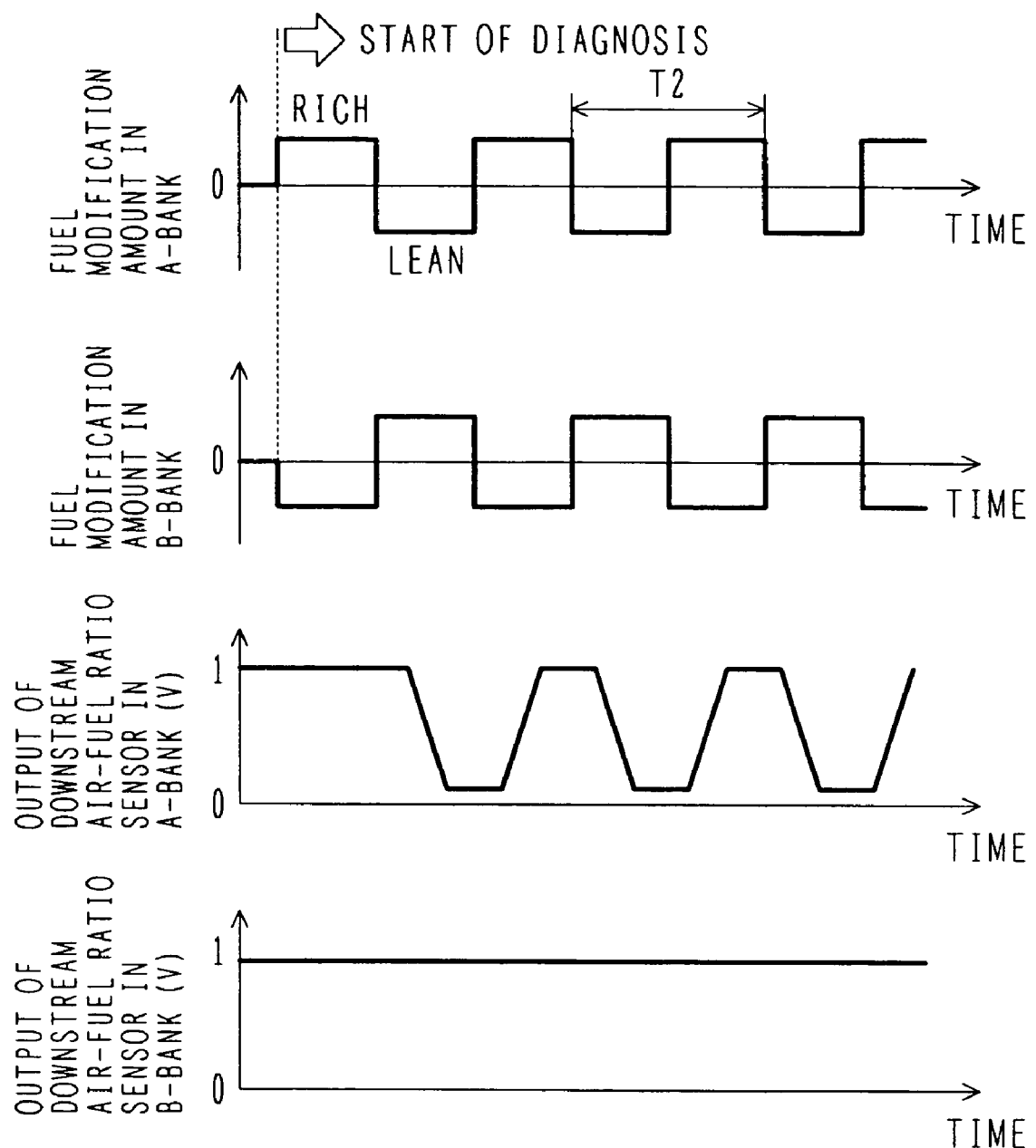
FIG. 8 is a set of charts showing the fuel modification amounts in the respective banks and the outputs of the downstream air-fuel ratio sensors when an oxygen storage capability of a pre-catalyst differs between A and B banks.

FIG. 8 is a set of charts showing the case where respective oxygen storage capabilities (OSC's) of the pre-catalysts 70, 70 differ from each other between the A and B banks 36, 37. In this case, because the OSC of the pre-catalyst 70 on the A bank 36 side is small and the OSC of the pre-catalyst 70 on the B bank 37 side is large, the downstream air-fuel ratio sensor 82 on the A bank 36 side can be diagnosed, but the downstream air-fuel ratio sensor 82 on the B bank 37 side cannot be diagnosed. Thus, because the responses of the downstream air-fuel ratio sensors 82, 82 depend on the OSC's of the corresponding pre-catalysts 70, 70, the A and B banks 36, 37 are required to individually switch over the rich and lean operations in an independent manner in order to diagnose the downstream air-fuel ratio sensors 82, 82. This requirement can be satisfied by switching over the rich and lean operations in accordance with the outputs of the downstream air-fuel ratio sensors 82, 82.

The method shown in FIGS. 4 and 5 is intended to suppress an increase of the emission amount of, in particular, NOx. As an alternative, a method shown in FIGS. 9 and 10 can be employed to suppress an increase of the emission amount of HC and CO instead of NOx.

Figure 9:
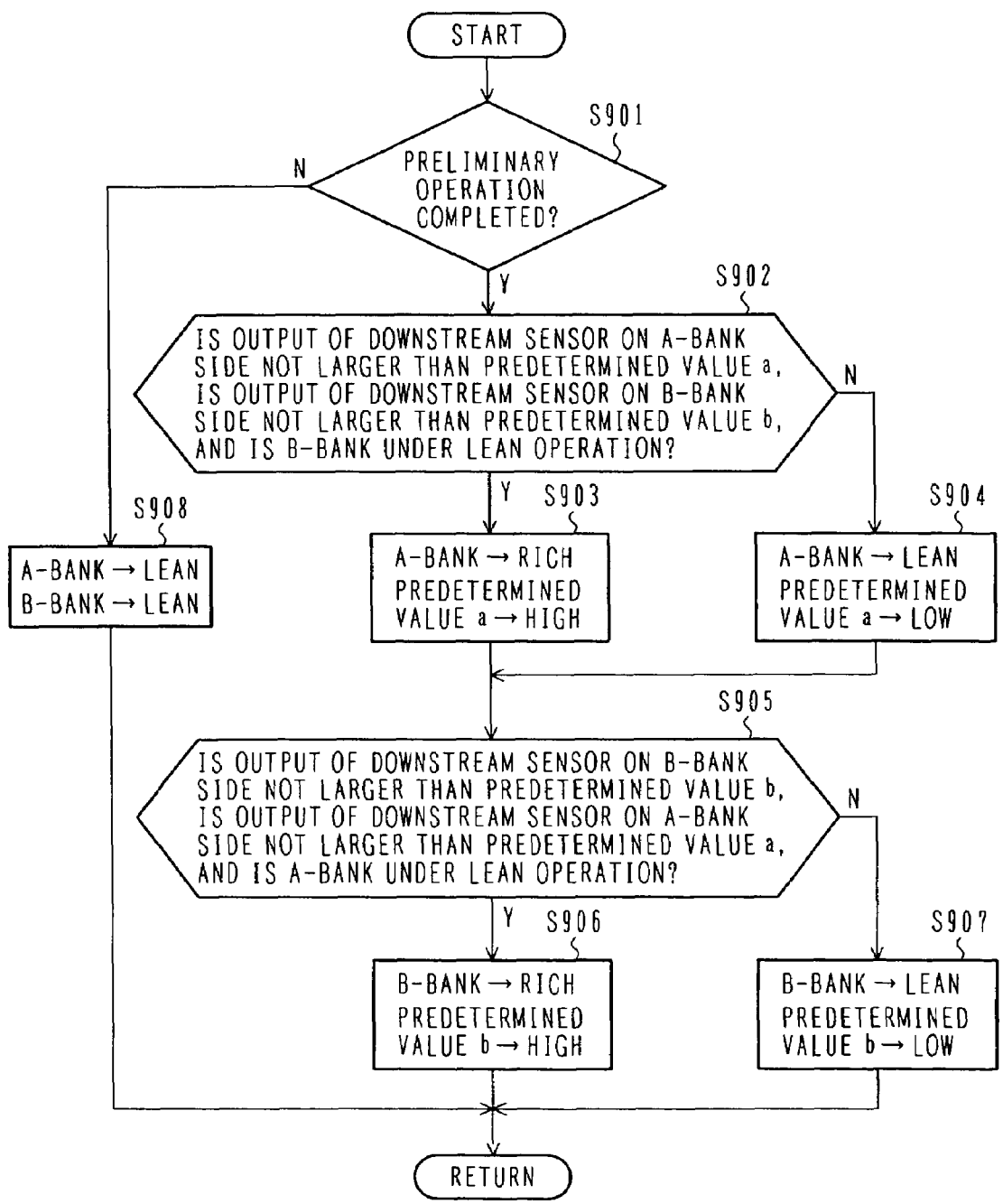
FIG. 9 is a flowchart showing another example of the rich/lean switching routine used in the diagnosis of the downstream air-fuel ratio sensors, which is executed by the control unit.

FIG. 9 is a flowchart showing another example of the rich/lean switching routine used in the diagnosis of the downstream air-fuel ratio sensors, which is executed by the control unit 100. The diagnosis is performed on condition that the engine is under the steady operation and the under-floor catalyst 75 is activated. When passive diagnosis is also performed in a combined manner, the active diagnosis may be performed only if a normal result could not been obtained with determination of the passive diagnosis. When those conditions are satisfied, both (the cylinder groups of) the A bank 36 and the B bank 37 are temporarily brought into the lean operation at the start of the diagnosis (as described later).

First, in step S901, it is determined whether the preliminary operation at the start of the diagnosis is completed. If the preliminary operation is completed, the control flow proceeds to step S902, and if not completed, it proceeds to step S908. In step S908, both the A and B banks 36, 37 are brought into the lean operation. On the other hand, in step S902 to which the control flow proceeds if the preliminary operation is completed, it is determined whether the output of the downstream air-fuel ratio sensor 82 on the A bank 36 side is not larger than a predetermined value a, whether the output of the downstream air-fuel ratio sensor 82 on the B bank 37 side is not larger than a predetermined value b, and whether the B bank 37 is under the lean operation. If those conditions are satisfied, the control flow proceeds to step S903 in which the A bank 36 is brought into the rich operation and the predetermined value a is switched over to a high level (about 0.6 V). If those conditions are not satisfied, the control flow proceeds to step S904 in which the A bank 36 is brought into the lean operation and the predetermined value a is switched over to a low level (about 0.2 V).

In next step S905, it is determined whether the output of the downstream air-fuel ratio sensor 82 on the B bank 37 side is not larger than the predetermined value b, whether the output of the downstream air-fuel ratio sensor 82 on the A bank 36 side is not larger than the predetermined value a, and whether the A bank 36 is under the lean operation. If those conditions are satisfied, the control flow proceeds to step S906 in which the B bank 37 is brought into the rich operation and the predetermined value b is switched over to a high level (about 0.6 V). If those conditions are not satisfied, the control flow proceeds to step S907 in which the B bank 37 is brought into the lean operation and the predetermined value b is switched over to a low level (about 0.2 V).

Figure 10:
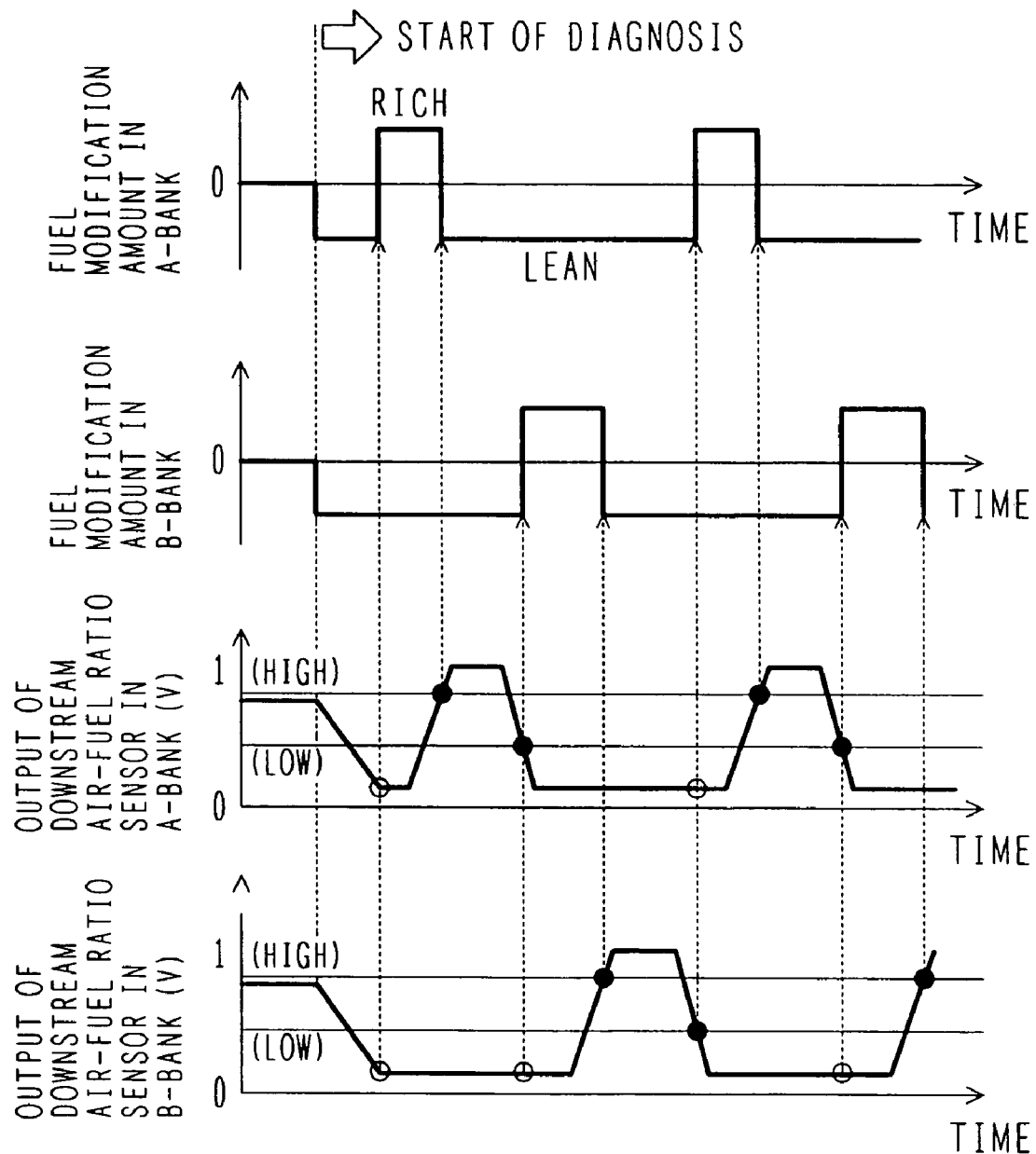
FIG. 10 is a set of charts showing changes in the fuel modification amounts in the respective banks and the outputs of the downstream air-fuel ratio sensors when the rich/lean switching routine shown in FIG. 9 is executed.

FIG. 10 is a set of charts showing the fuel modification amounts in the respective banks 36, 37 and the outputs of the downstream air-fuel ratio sensors 82, 82 when the rich/lean switching routine shown in FIG. 9 is executed. In this example, both the A and B banks 36, 37 are brought into the lean operation at the same time as the start of the diagnosis. This step is intended to prevent HC and CO from leaking to the downstream side of the under-floor catalyst 75 (i.e., to the exterior) immediately after the start of the diagnosis. By increasing the oxygen storage amount of the under-floor catalyst 75, it is possible to purify HC and CO even when the exhaust gas at the inlet of the under-floor catalyst 75 (i.e., the under-floor exhaust gas) becomes somewhat rich. Subsequently, when the outputs of the downstream air-fuel ratio sensors 82, 82 in both the A and B banks 36, 37 are decreased to be not larger than a predetermined value, the A bank 36 is brought into the rich operation. Responsively, the output of the downstream air-fuel ratio sensor 82 on the A bank 36 side is gradually changed to take a value in the rich state while undergoing influences of the dead time caused by a lag in air transfer and the dynamics of oxygen storage capability of the pre-catalyst 70.

Then, when the output of the downstream air-fuel ratio sensor 82 on the A bank 36 side is increased to be not smaller than the predetermined value a (high), the A bank 36 is brought into the lean operation. Responsively, the output of the downstream air-fuel ratio sensor 82 on the A bank 36 side is gradually changed to take a value in the lean state while undergoing the influences of the dead time and the dynamics, mentioned above, in a reversed way to the above case. When the output of the downstream air-fuel ratio sensor 82 on the A bank 36 side is decreased to be not larger than the predetermined value a (low), the B bank 37 is now brought into the rich operation. Responsively, as in the case of the A bank 36, the output of the downstream air-fuel ratio sensor 82 on the B bank 37 side is gradually changed to take a value in the rich state while undergoing influences of the dead time caused by a lag in air transfer and the dynamics of oxygen storage capability of the pre-catalyst 70. Then, when the output of the downstream air-fuel ratio sensor 82 on the B bank 37 side is increased to be not smaller than the predetermined value b (high), the B bank 37 is brought into the lean operation. Responsively, the output of the downstream air-fuel ratio sensor 82 on the B bank 37 side is gradually changed to take a value in the lean state. When the output of the downstream air-fuel ratio sensor 82 on the B bank 37 side is decreased to be not larger than the predetermined value b (low), the A bank 36 is brought again into the rich operation.

Also in this example, by repeating a series of the above-described operations at least once more, the outputs of the downstream air-fuel ratio sensors 82, 82 in both the A and B banks 36, 37 are varied in excess of the respective predetermined values to be able to detect deteriorations of the downstream air-fuel ratio sensors 82, 82 (as described later). Also, by performing control in such a manner as making the sum of the fuel modification amounts zero (0) when one of the A and B banks 36, 37 is brought into the rich operation and the other is brought into the lean operation, the under-floor exhaust gas is held nearly at the stoichiometric ratio even during the diagnosis, and the exhaust gas is effectively purified by the under-floor catalyst 75. As a result, a worsening of exhaust emissions can be avoided. Furthermore, the rich-lean amplitude (i.e., the difference between the rich air-fuel ratio and the lean air-fuel ratio) resulting from the fuel modification is preferably set to be in a predetermined range of, e.g., about 2 to 0.8 from the viewpoint of preventing an increase of revolution variation.

Figure 11A:
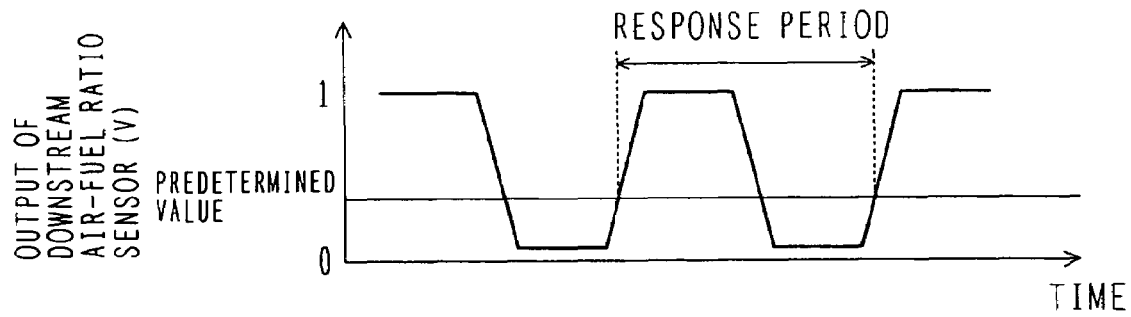
FIG. 11A is a chart for explaining a response period of the downstream air-fuel ratio sensor.
Figure 11B:
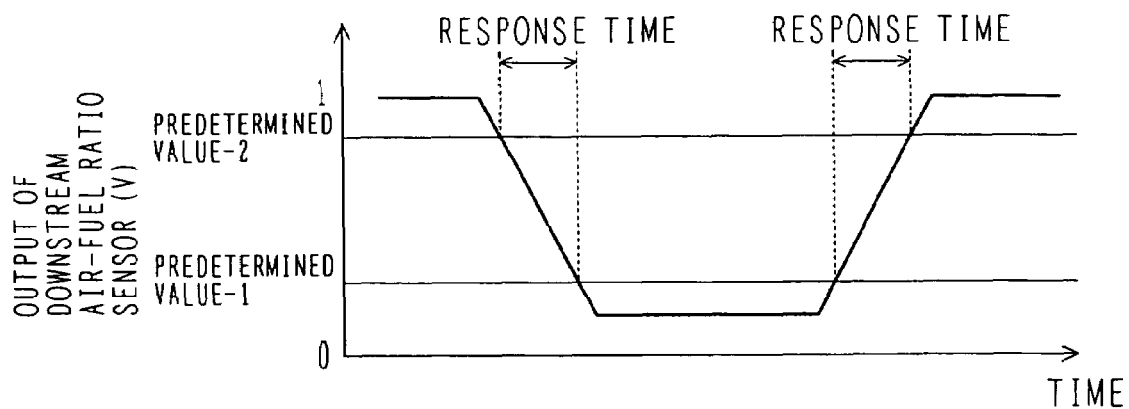
FIG. 11B is a chart for explaining a response time of the downstream air-fuel ratio sensor.

FIG. 11 is a set of charts for explaining a response period and a response time of each of the downstream air-fuel ratio sensors 82, 82. FIG. 11A shows the response period. The term "response period" means an oscillation period of the output of the downstream air-fuel ratio sensor 82 and is defined as a time from a point in time at which the sensor output exceeds a predetermined value to a point in time at which the sensor output exceeds the predetermined value again. FIG. 11B shows the response time. The term "response time" is defined as a time required for the output of the downstream air-fuel ratio sensor 82 to change from one predetermined value 1 to another predetermined value 2 larger than the predetermined value 1. In the case of the $O_2$ sensor, it is preferred that the predetermined values 1 and 2 be set to about 0.2 V and 0.6 V, respectively.

Figure 12:
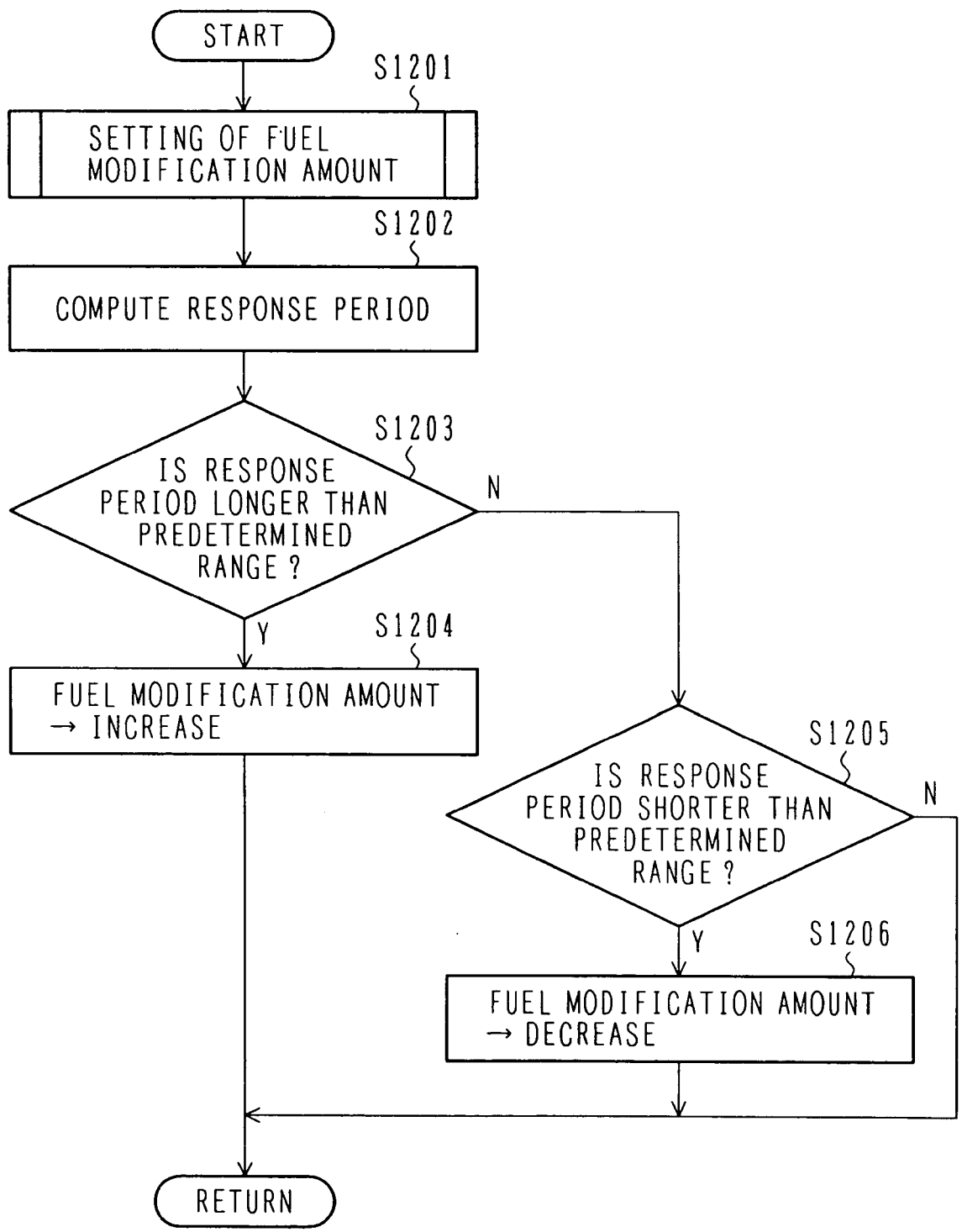
FIG. 12 is a flowchart showing one example of a response period adjusting routine used in the diagnosis of the downstream air-fuel ratio sensor, which is executed by the control unit.

FIG. 12 is a flowchart showing one example of a response period adjusting routine used in the diagnosis of the downstream air-fuel ratio sensor, which is executed by the control unit 100.

In this routine, first, the fuel modification amount is set in step S1201 based on the engine operating status, such as the intake air amount and the engine revolution speed. Then, in step S1202, the response period is computed from the output of the downstream air-fuel ratio sensor 82. In step S1203, it is determined whether the response period is longer than an upper limit value in a predetermined range (about several seconds), which is decided in advance. If the response period is longer than the upper limit value, the control flow proceeds to step S1204 in which the fuel modification amount is increased from the amount set in step S1201. If the response period is not longer than the upper limit value, the control flow proceeds to step S1205. In step S1205, it is determined whether the response period is shorter than a lower limit value in the predetermined range. If so, the control flow proceeds to step S1206 in which the fuel modification amount is decreased from the amount set in step S1201, and if not so, this routine is brought to an end.

By executing the response period adjusting routine, it is possible to hold the response period of the downstream air-fuel ratio sensor 82 within the predetermined range, to cut the time required for the diagnosis, and to ensure a satisfactory diagnosis frequency.

Figure 13:
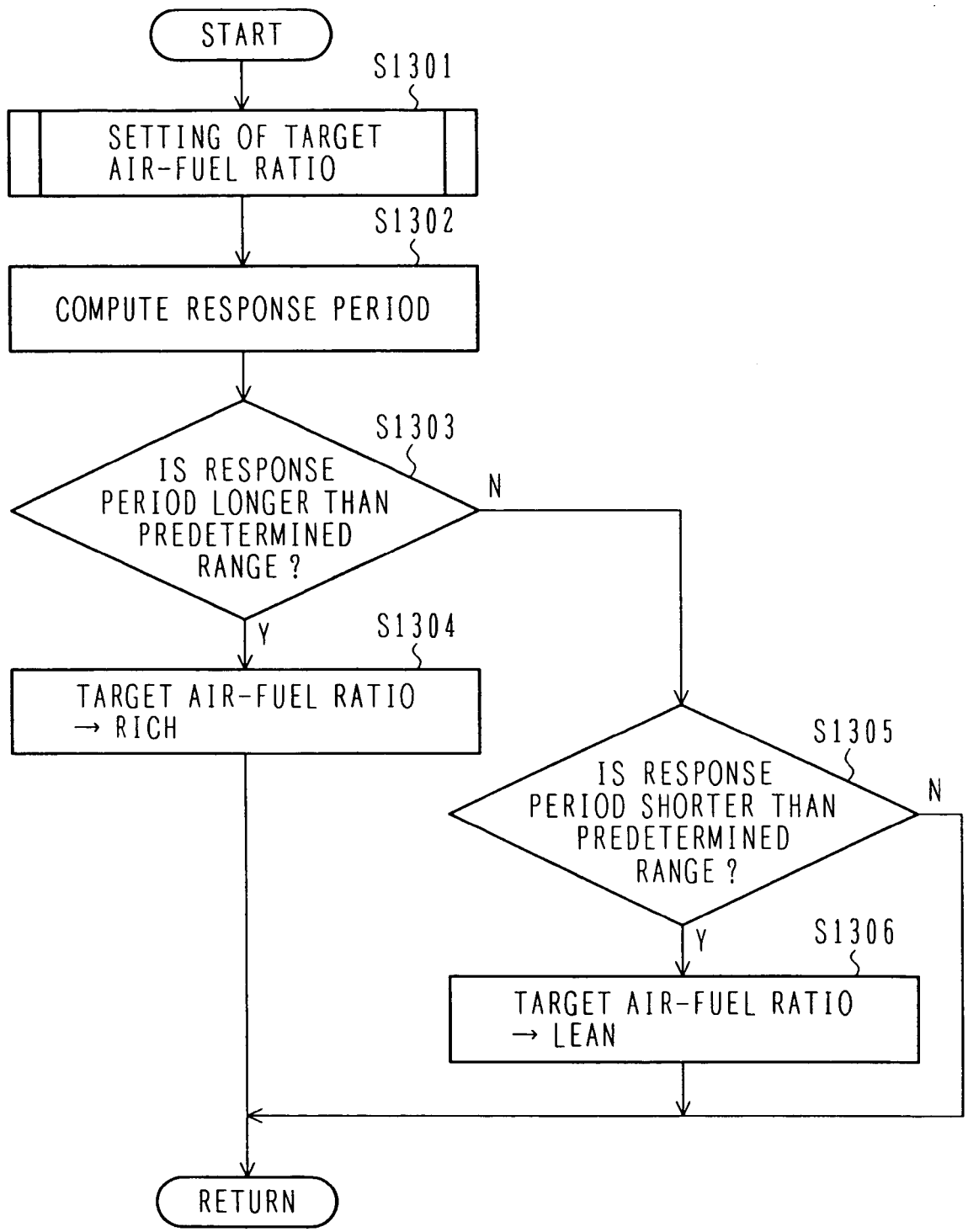
FIG. 13 is a flowchart showing another example of the response period adjusting routine used in the diagnosis of the downstream air-fuel ratio sensor, which is executed by the control unit.

FIG. 13 is a flowchart showing another example of the response period adjusting routine used in the diagnosis of the downstream air-fuel ratio sensor, which is executed by the control unit 100. In this example, when feedback control of the air-fuel ratio is performed using the upstream air-fuel ratio sensors (LAF sensors) 81, 81, the response period is held within the predetermined range by changing a target air-fuel ratio used in each sensor 81.

More specifically, in step S1301, the target air-fuel ratio is set based on the intake air amount and the engine revolution speed. Then, in step S1302, the response period is computed from the output of the downstream air-fuel ratio sensor 82. In step S1303, it is determined whether the response period is longer than the upper limit value in the predetermined range (about several seconds). If the response period is longer than the upper limit value, the control flow proceeds to step S1304 in which the target air-fuel ratio is changed to the rich side from the value set in step S1301. If the response period is not longer than the upper limit value, the control flow proceeds to step S1305. In step S1305, it is determined whether the response period is shorter than a lower limit value in the predetermined range. If so, the control flow proceeds to step S1306 in which the target air-fuel ratio is changed to the lean side from the value set in step S1301, and if not so, this routine is brought to an end. By thus employing the target air-fuel ratio used in the feedback control of the air-fuel ratio, it is possible to switch over the rich and lean operations with high accuracy and to improve exhaust emission characteristics.

Figure 14:
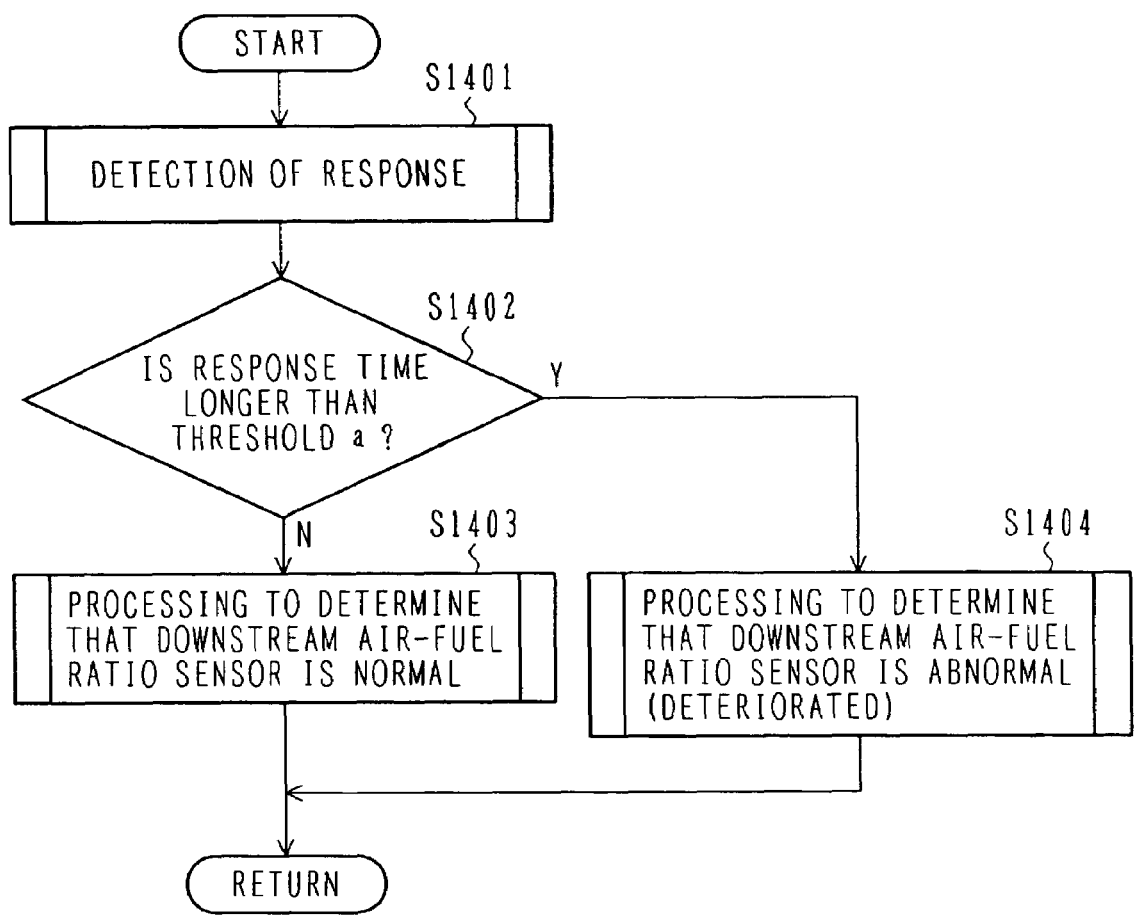
FIG. 14 is a flowchart showing one example of a deterioration determining routine used in the diagnosis of the downstream air-fuel ratio sensor, which is executed by the control unit.

FIG. 14 is a flowchart showing one example of a deterioration determining routine used in the diagnosis of the downstream air-fuel ratio sensor, which is executed by the control unit 100.

In this routine, first, the response of each of the downstream air-fuel ratio sensors 82, 82 is detected in step S1401. Herein, the response can be detected by computing a time (response time) required for the output of the downstream air-fuel ratio sensor 82 to reach, from one predetermined value 1, another predetermined value 2, or by switching over the rich and lean operations several times and computing an average value or a central value of the measured response times. Then, if it is determined in step S1402 that the response time is longer than a threshold a decided depending on the engine operating status, the control flow proceeds to step S1404, and if not so, the control flow proceeds to step S1403. In step S1403, it is determined that the downstream air-fuel ratio sensor 82 is normal, following which the determination result is stored in a predetermined memory. In step S1404, it is determined that the downstream air-fuel ratio sensor 82 is abnormal (deteriorated), following which the determination result is stored in a predetermined memory and an alarm lamp is turned on. As an alternative, the alarm lamp may be turned on only when the determination of an abnormality is resulted in succession a predetermined number of times. After the processing to determine that the downstream air-fuel ratio sensor 82 is normal or abnormal (deteriorated), the rich/lean switching operation is stopped and the active diagnosis is brought to an end.

Figure 15:
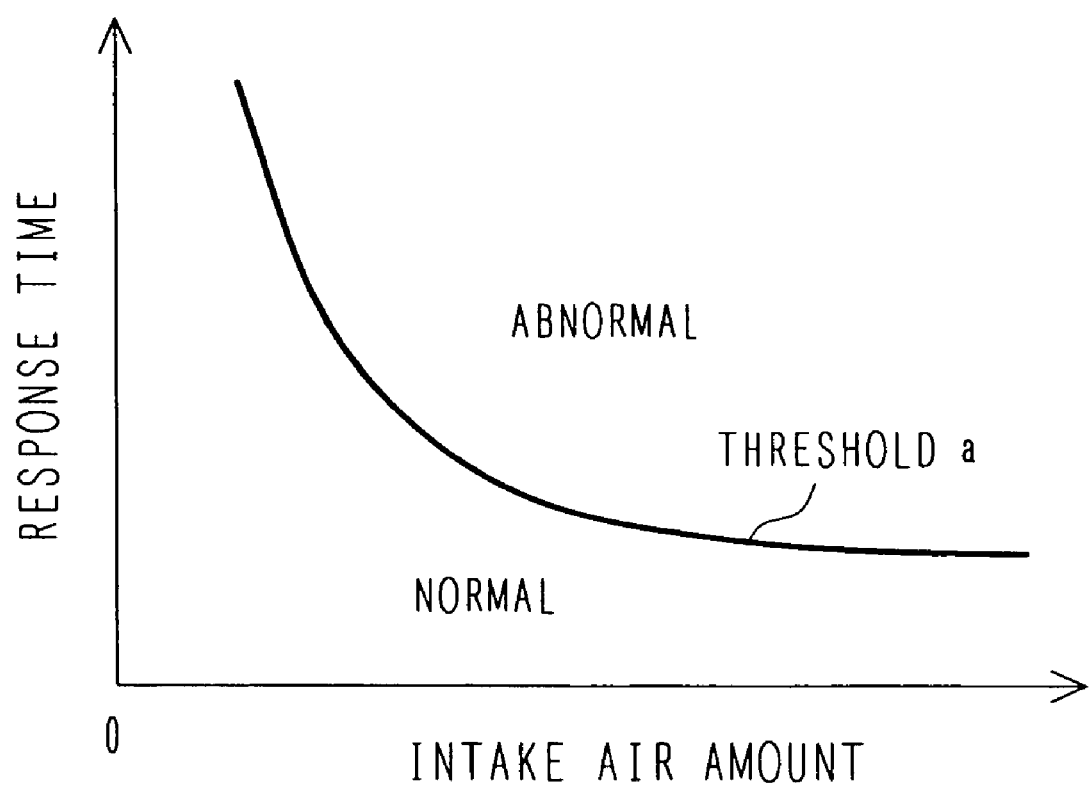
FIG. 15 is a graph showing an example of setting a threshold a for the response time.

FIG. 15 is a graph showing an example of setting a threshold a for the response time, which is used in step S1402 of FIG. 14. The larger the intake air amount, the shorter is the response time. Therefore, the diagnosis accuracy is increased by setting the threshold a to a smaller value as the intake air amount increases, as shown in FIG. 15. Also, because the response time is affected by the condition that the exhaust gas strikes against the sensor, it is preferable that the threshold be set for each of the left- and right-side banks 36, 37.

Second Embodiment

Diagnosis of Pre-Diagnosis

A diagnostic device 2 of an engine exhaust purifying system according to a second embodiment of the present invention will be described below. The diagnostic device 2 of the engine exhaust purifying system according to the second embodiment is intended to make diagnosis of the pre-catalysts 70, 70 and differs from the device according to the first embodiment only in diagnosis procedures executed by the control unit 100, while the construction of the engine itself is the same as that shown in FIGS. 1 and 2. For that reason, the construction of the engine 10 is not described here.

Figure 16:
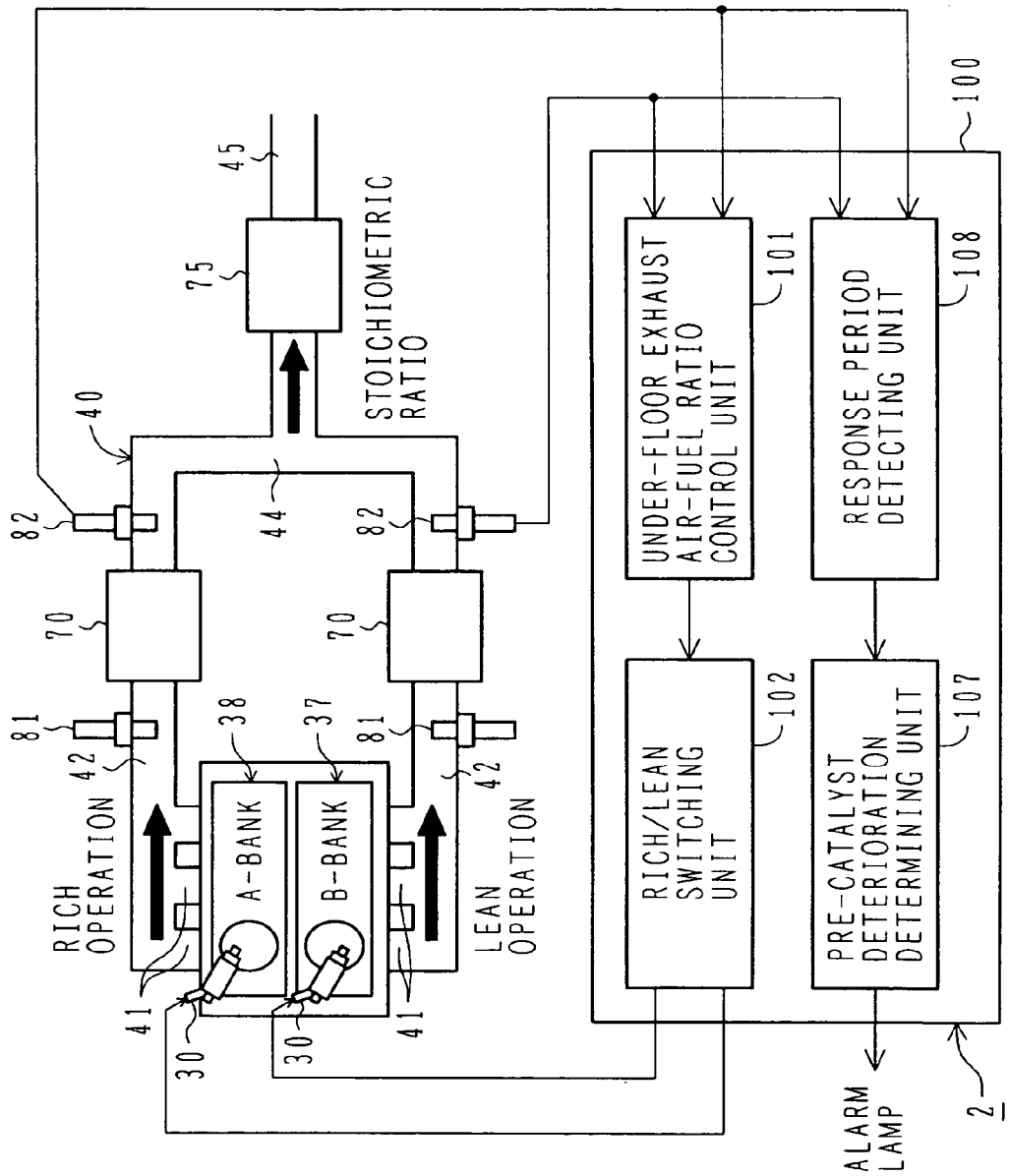
FIG. 16 is a schematic view showing a diagnostic device of an engine exhaust purifying system as one example according to a second embodiment of the present invention, the view being limited to a section that takes part in diagnosis of the engine exhaust purifying system.

As shown in FIG. 16 illustrating a functional block diagram, a control unit 100 in this second embodiment comprises, as in the first embodiment, an under-floor exhaust air-fuel ratio control unit 101 for performing control to keep the air-fuel ratio of the exhaust gas flowing into the under-floor catalyst 75, serving as the main catalyst, near a stoichiometric ratio in accordance with the outputs of the downstream air-fuel ratio sensors 82, 82, and a rich/lean switching unit 102 for switching over the air-fuel ratio in each of (the cylinder groups of) the A and B banks 36, 37 to be rich or lean in accordance with information obtained from the under-floor exhaust air-fuel ratio control unit 101, thereby making the diagnosis of the pre-catalysts 70, 70. In addition, the control unit 100 comprises a response period detecting unit 106 for detecting a response period of each of the downstream air-fuel ratio sensors 82, 82 or information (modification amount of the fuel injection amount) related to the response period when the rich/lean switching of the air-fuel ratio in each of (the cylinder groups) of the A and B banks 36, 37 is performed, and a pre-catalyst deterioration determining unit 107 for determining a deterioration of each of the pre-catalysts 70, 70 based on the detected response period or related information. If a deterioration of any of the pre-catalysts 70, 70 is determined, an alarm lamp is turned on.

Stated another way, the control unit 100 actively controls the fuel injection amounts from the fuel injection valves 30 associated with the respective cylinder groups of the A bank 36 and the B bank 37 such that they are each alternately subjected to the rich operation and the lean operation, thereby detecting the response period of each of the downstream air-fuel ratio sensors 82, 82. Then, the control unit 100 determines a deterioration of each of the pre-catalysts 70, 70 based on the detected response period.

Figure 17:
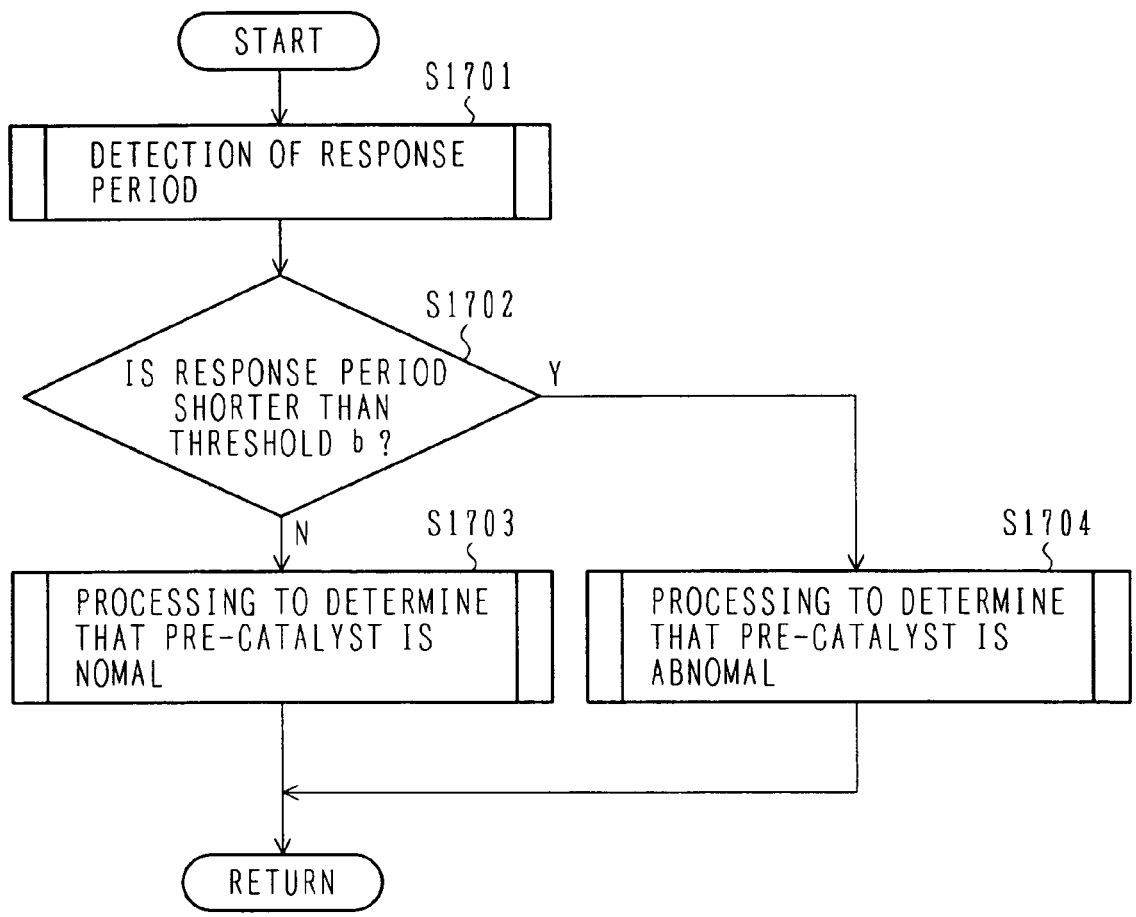
FIG. 17 is a flowchart showing one example of a deterioration determining routine used in diagnosis of the pre-catalyst, which is executed by the control unit.

Details of such diagnosis of the pre-catalysts 70, 70 will be described below with reference to a flowchart of FIG. 17 showing one example of a deterioration determining routine used in the diagnosis of the pre-catalysts, which is executed by the control unit 100.

The pre-catalyst deterioration determining routine shown in FIG. 17 is executed in continuation to the rich/lean switching routine (FIGS. 4 and 9), the response period adjusting routine (FIGS. 12 and 13), and the deterioration determining routine (FIG. 14) for the downstream air-fuel ratio sensor, which have been described above in the first embodiment. When any of the downstream air-fuel ratio sensors 82, 82 is determined as being abnormal (deteriorated) with the deterioration determining routine (FIG. 14) in the first embodiment, the pre-catalyst deterioration determining routine in this second embodiment is not executed.

In the pre-catalyst deterioration determining routine shown in FIG. 17, first, the response period is detected in step S1701. As shown in FIG. 11A, the response period is defined as a time required for the output of the downstream air-fuel ratio sensor to return from a predetermined value to the predetermined value again. When the response period is short, this can be determined as indicating that the OSC of corresponding one of the pre-catalysts 70, 70 has reduced and the purifying performance has deteriorated. From that point of view, it is determined in step S1702 whether the response period is shorter than a threshold b that is decided depending on the engine operating status. If so, the control flow proceeds to step S1704, and if not so, the control flow proceeds to step S1703. In step S1704, the control unit executes processing to determine that the pre-catalyst is abnormal. With this processing, the fact of the pre-catalyst 70 being deteriorated is stored in a predetermined memory and an alarm lamp is turned on. In step S1703, the control unit executes processing to determine that the pre-catalyst is normal. Stated another way, the fact of the pre-catalyst 70 being diagnosed and determined to be normal is stored in a predetermined memory and a diagnosis run counter is counted up.

Figure 18A:
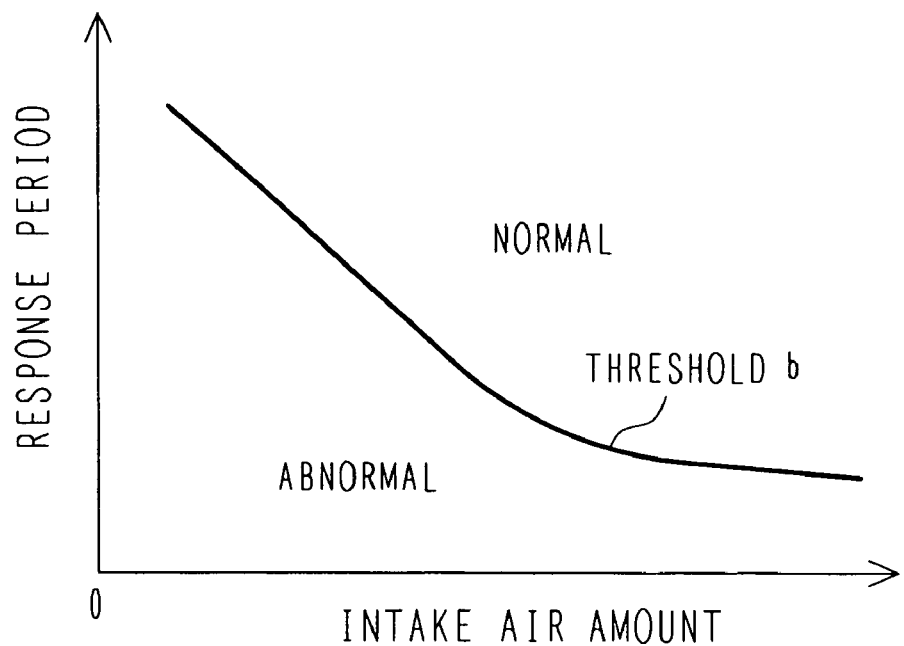
FIG. 18A is a graph showing the threshold b for the response period and FIG. 18B is a graph showing the threshold b for a modified response period.
Figure 18B:
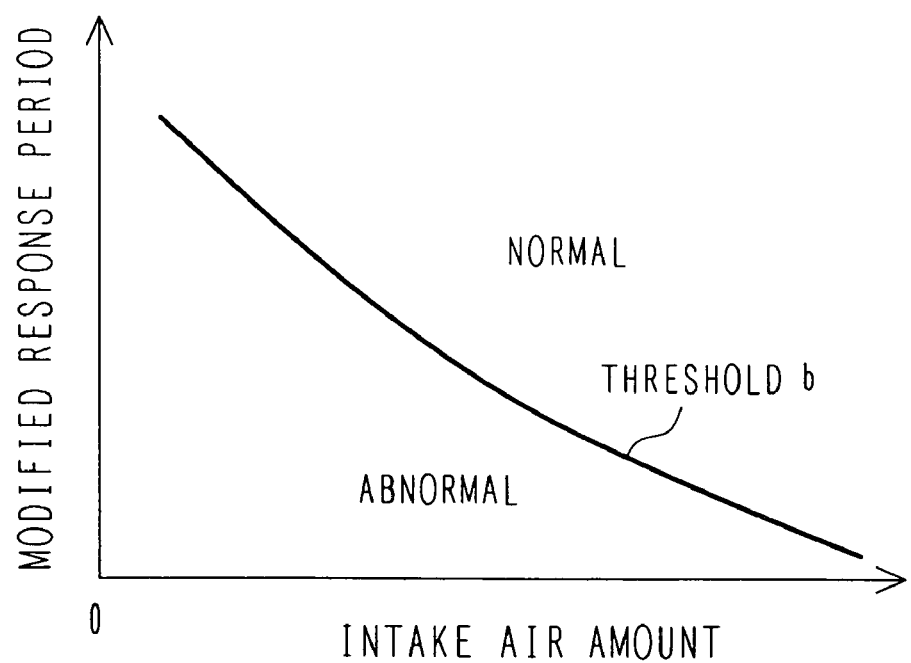

FIG. 18 shows examples of setting the threshold b used in step S1702 of the pre-catalyst deterioration determining routine shown in FIG. 17. More specifically, the threshold b shown in FIG. 18A is set such that a shorter response period is provided as the intake air amount increases. At a short response period, however, the response time of the downstream air-fuel ratio sensor 82 becomes so predominant as to make it difficult to execute the normality/abnormality determination of the pre-catalyst. In consideration of such a difficulty, as shown in FIG. 18B, a modified response period resulting by excluding the response time from the response period may be used as the threshold b. By using the modified response period, the deterioration of the pre-catalyst 70 can be accurately determined over a wide range without being affected by the response of the downstream air-fuel ratio sensor 82. With this embodiment, since the air-fuel ratio of the under-floor exhaust gas is controlled to be held near the stoichiometric ratio during the diagnosis, the deterioration of exhaust emissions can be avoided. Further, since the rich/lean operation is performed until the output of the downstream air-fuel ratio sensor 82 is reversed, the OSC of the pre-catalyst 70 can be accurately measured (estimated).

While the deterioration determination of the pre-catalyst 70 is performed based on the response period in the example described above, it can also be performed based on, instead of the response period, the fuel modification amount (i.e., the modification amount of the fuel injection amount) that is obtained from the rich/lean switching unit 102.

Figure 19:
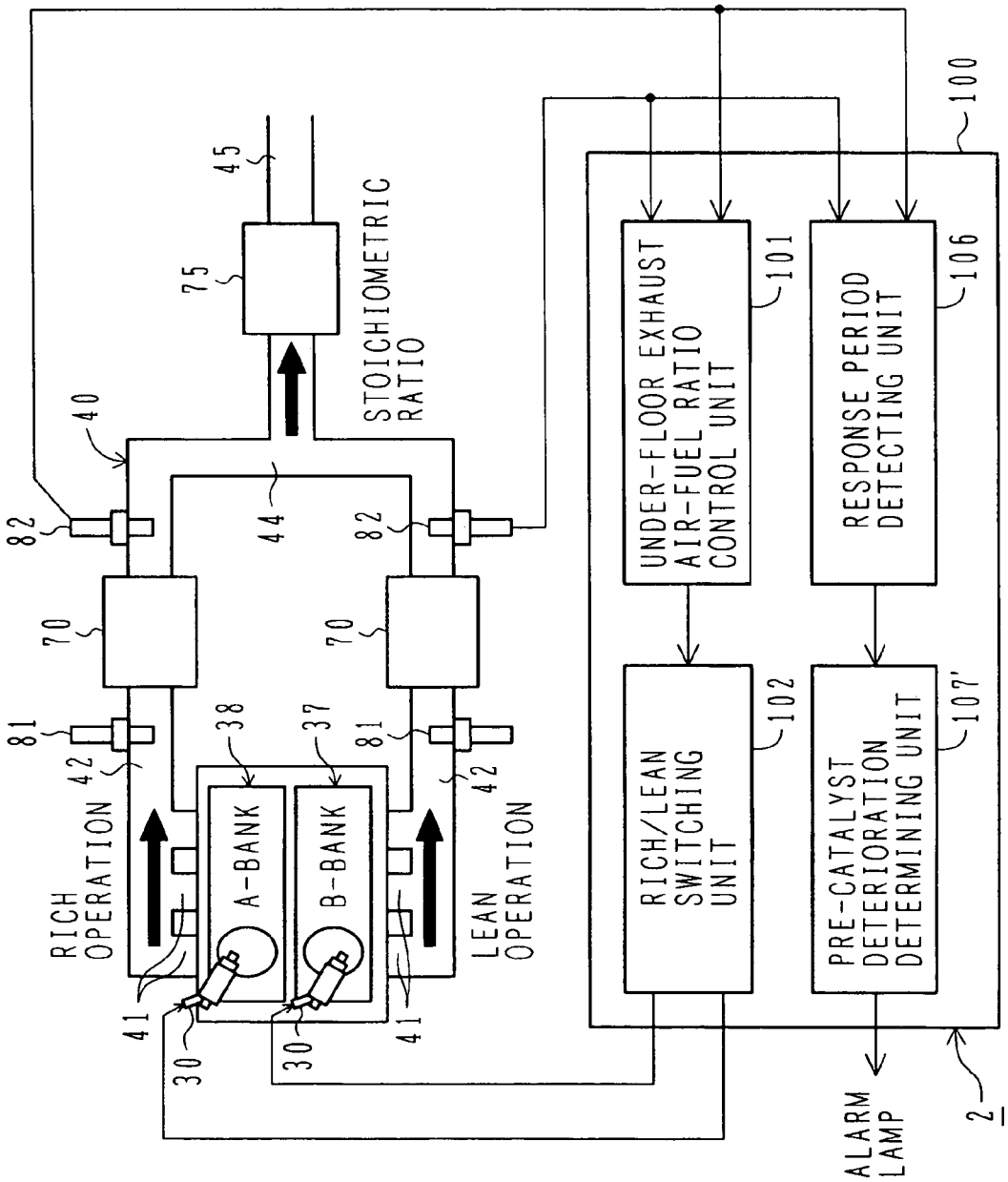
FIG. 19 is a schematic view showing the diagnostic device of the engine exhaust purifying system as another example according to a second embodiment of the present invention, the view being limited to a section that takes part in the diagnosis of the engine exhaust purifying system.

In such a modification, as shown in a functional block diagram of the control unit 100 in FIG. 19, a pre-catalyst deterioration determining unit 107' is designed to determine that the pre-catalyst 70 has deteriorated, when the fuel modification amount, i.e., information related to the response period, is not larger than a predetermined value set depending on the engine operating status.

Figure 20:
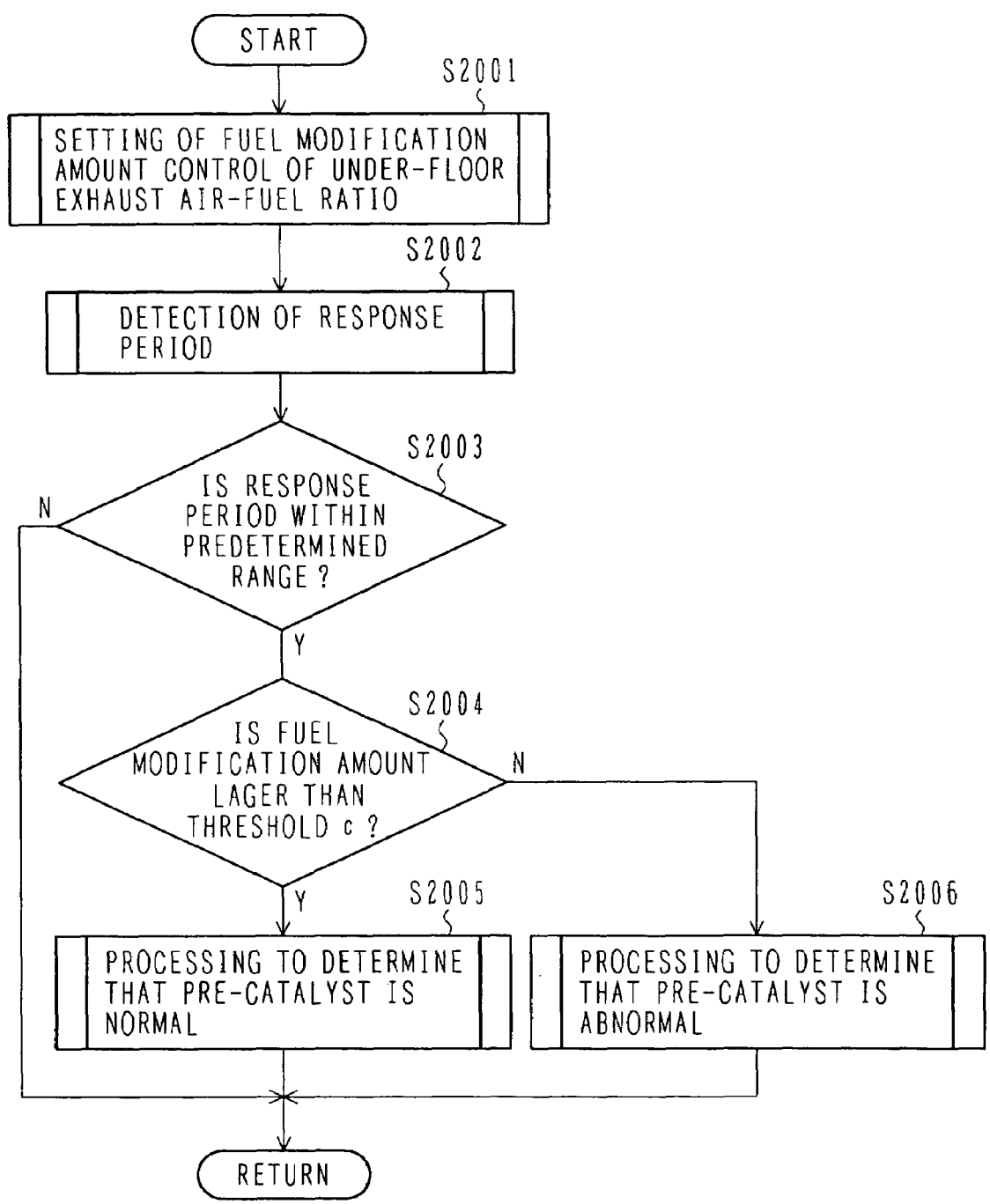
FIG. 20 is a flowchart showing one example of a pre-catalyst deterioration determining routine used in the diagnostic device of the engine exhaust purifying system shown in FIG. 19.

FIG. 20 is a flowchart showing one example of a pre-catalyst deterioration determining routine using the fuel modification amount.

In this pre-catalyst deterioration determining routine, in step S2001, the fuel modification amount for the rich/lean operation is set and air-fuel ratio control of the under-floor exhaust gas is performed. Herein, the control is performed in accordance with the routine shown in FIG. 12 or 13, for example, such that the response period is held within a predetermined range. Then, the response period is detected in step S2002 and it is determined in step S2003 whether the response period is within the predetermined range. If the response period is within the predetermined range, the control flow proceeds to steps subsequent to S2004, but if not so, this routine is brought to an end. In step S2004, it is determined whether the fuel modification amount is larger than a threshold c. When the engine operating status and the response period are constant, the OSC of the pre-catalyst 70 is decided depending on the fuel modification amount (or the output of the upstream air-fuel ratio sensor 81). Accordingly, the fuel modification amount being larger than the threshold c, which has been set when the OSC of the pre-catalyst 70 is normal, means that the OSC of the pre-catalyst 70 is not deteriorated. Hence, if the fuel modification amount is larger than the threshold c, the control flow proceeds to step S2005 in which the control unit executes processing to determine that the pre-catalyst is normal. If the fuel modification amount is smaller than the threshold c, the control flow proceeds to step S2006 in which the control unit executes processing to determine that the pre-catalyst is abnormal.

Figure 21:
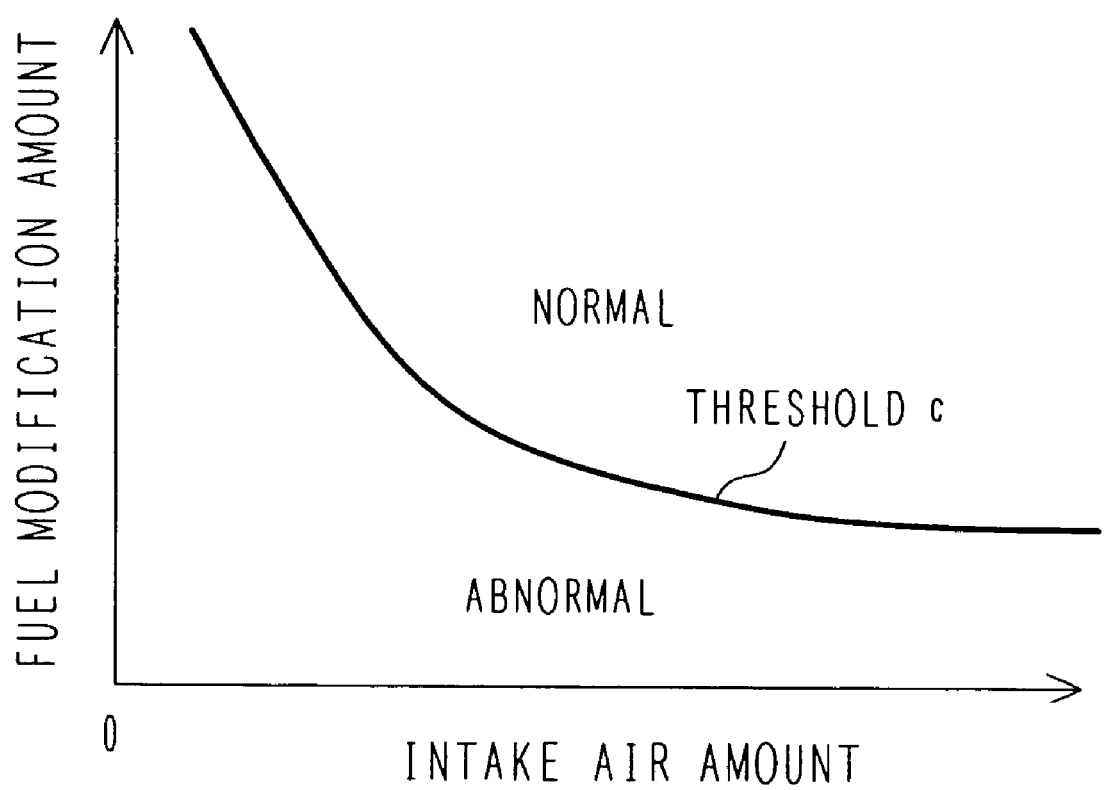
FIG. 21 a graph showing an example of setting a threshold c for the fuel modification amount.

FIG. 21 a graph showing an example of setting the threshold c used in step S2004 of the pre-catalyst deterioration determining routine shown in FIG. 20. In FIG. 21, the threshold c is set for the fuel modification amount such that it is substantially in reverse proportional to the intake air amount. With this embodiment, since the response period is held constant, the diagnosis can be completed within a predetermined time and therefore a satisfactory diagnosis frequency can be ensured.

Third Embodiment

Diagnosis of Upstream Air-Fuel Ratio Sensors

A diagnostic device 3 of an engine exhaust purifying system according to a third embodiment of the present invention will be described below. The diagnostic device 3 of the engine exhaust purifying system according to the third embodiment is intended to make diagnosis of the upstream air-fuel ratio sensors 81, 81 and differs from the device according to the first embodiment only in diagnosis procedures executed by the control unit 100, while the construction of the engine itself is the same as that shown in FIGS. 1 and 2. For that reason, the construction of the engine 10 is not described here.

Figure 22:
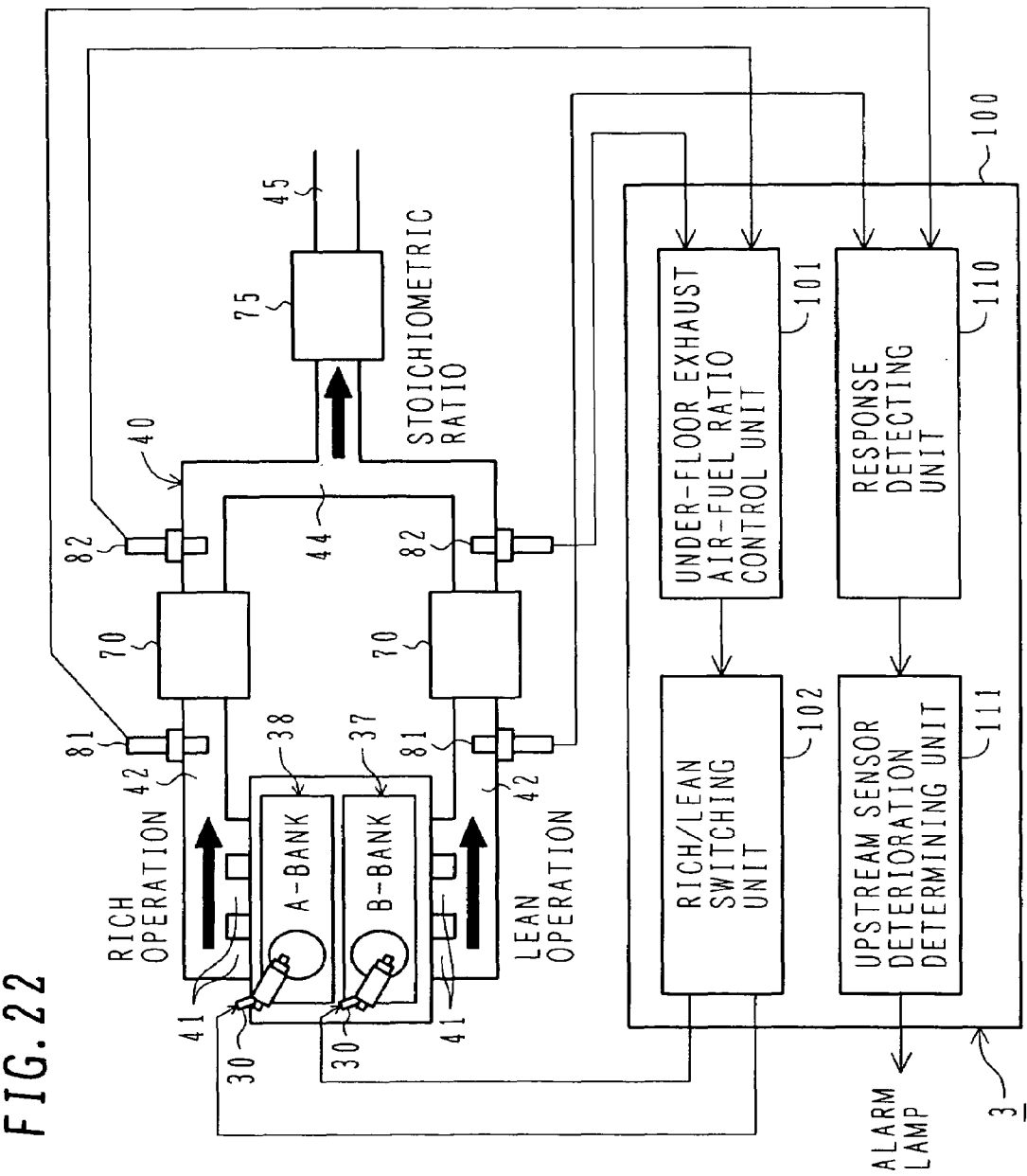
FIG. 22 is a schematic view showing a diagnostic device of an engine exhaust purifying system according to a third embodiment of the present invention, the view being limited to a section that takes part in diagnosis of the engine exhaust purifying system.

As shown in FIG. 22 illustrating a functional block diagram, a control unit 100 in this third embodiment comprises, as in the first embodiment, an under-floor exhaust air-fuel ratio control unit 101 for performing control to keep the air-fuel ratio of the exhaust gas flowing into the under-floor catalyst 75, serving as the main catalyst, near a stoichiometric ratio in accordance with the outputs of the downstream air-fuel ratio sensors 82, 82, and a rich/lean switching unit 102 for switching over the air-fuel ratio in each of (the cylinder groups of) the A and B banks 36, 37 to be rich or lean in accordance with information obtained from the under-floor exhaust air-fuel ratio control unit 101, thereby making the diagnosis of the upstream air-fuel ratio sensors 81, 81. In addition, the control unit 100 comprises a response detecting unit 110 for detecting a response of each of the upstream air-fuel ratio sensors 81, 81 or information (fuel modification amount) related to the response when the rich/lean switching of the air-fuel ratio in each of (the cylinder groups) of the A and B banks 36, 37 is performed, and an upstream sensor deterioration determining unit 111 for determining a deterioration of each of the upstream air-fuel ratio sensors 81, 81 based on the detected response or related information. If a deterioration of any of the upstream air-fuel ratio sensors 81, 81 is determined, an alarm lamp is turned on.

Stated another way, the control unit 100 actively controls the fuel injection amounts from the fuel injection valves 30 associated with the respective cylinder groups of the A bank 36 and the B bank 37 such that they are each alternately subjected to the rich operation and the lean operation, thereby detecting the response of each of the upstream air-fuel ratio sensors 81, 81. Then, the control unit 100 determines a deterioration of each of the upstream air-fuel ratio sensors 81, 81 based on the fuel modification amount that is computed by the rich/lean switching unit 102 as information substituted for the response.

Figure 23:
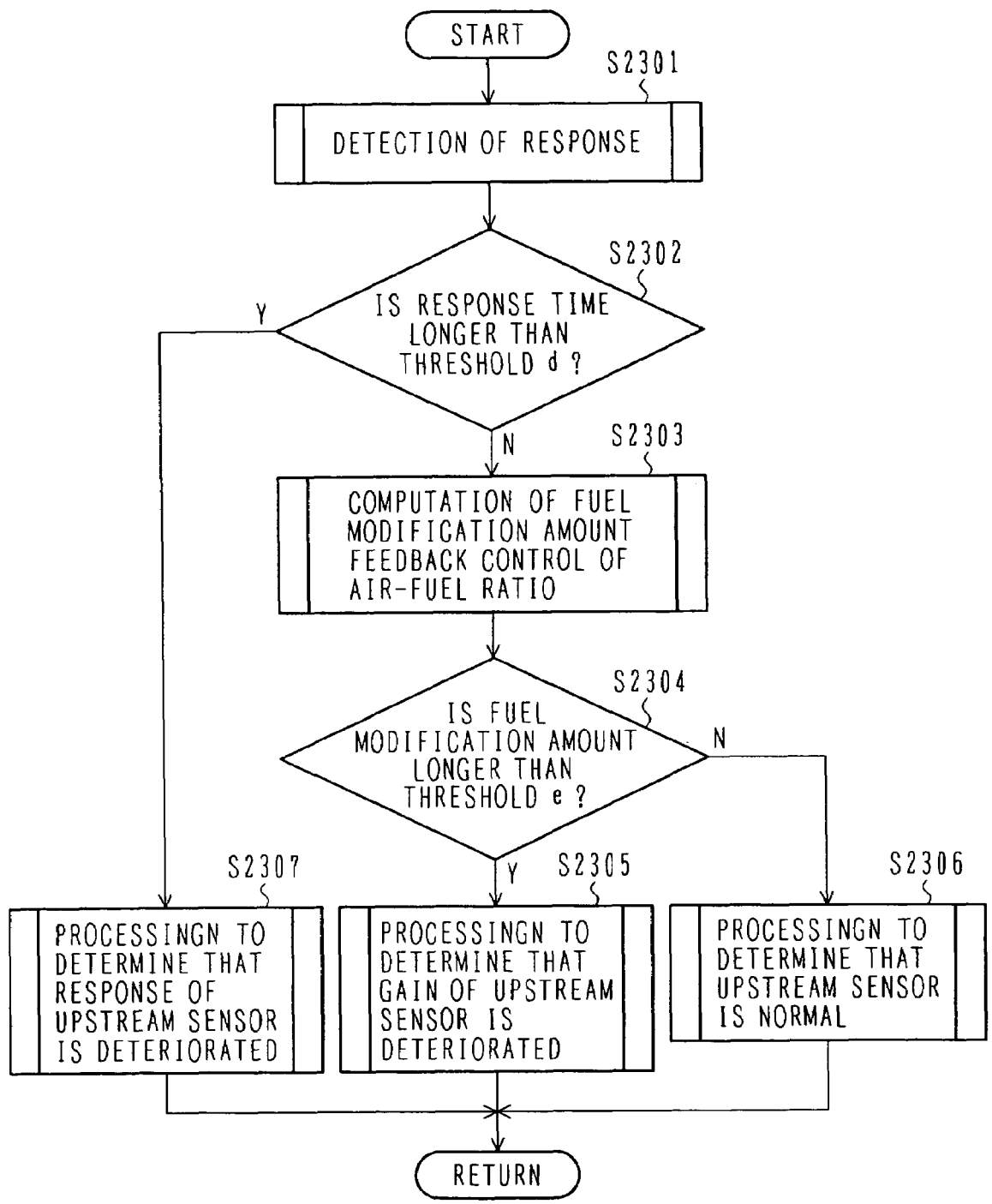
FIG. 23 is a flowchart showing one example of a deterioration determining routine used in diagnosis of the upstream air-fuel ratio sensors, which is executed by the control unit.

Details of such diagnosis of the upstream air-fuel ratio sensors 81, 81 will be described below with reference to a flowchart of FIG. 23 showing one example of a deterioration determining routine used in the diagnosis of the upstream air-fuel ratio sensors, which is executed by the control unit 100.

The deterioration determining routine for the upstream air-fuel ratio sensors, shown in FIG. 23, is executed at least after the under-floor catalyst 75 has been activated and the rich and lean operations for the diagnosis have been executed. First, in step S2301, the response is detected based on the output of each of the upstream air-fuel ratio sensors 81, 81. Herein, the response is detected by computing a response time required for the output of the upstream air-fuel ratio sensor 81 to reach, from one predetermined value, another predetermined value. Then, it is determined in step S2302 whether the response time is longer than a threshold d. If the response time is longer than the threshold d, the control flow proceeds to step S2307 in which the control unit executes processing to determine that the response of the upstream air-fuel ratio sensor is deteriorated. Thereafter, this routine is brought to an end. If the determination result in step S2302 is negated, the control flow proceeds to step S2303 in which the fuel injection amount is feedback controlled so that a predetermined (target) air-fuel ratio is held. Then, in step S2304, it is determined whether the fuel modification amount (i.e., the modification amount of the fuel injection amount) is larger than a threshold e. If so, the control flow proceeds to step S2305 in which the control unit executes processing to determine that the gain of the upstream air-fuel ratio sensor is deteriorated. If not so, the control flow proceeds to step S2306 in which the control unit executes processing to determine that the upstream air-fuel ratio sensor is normal.

Figure 24A:
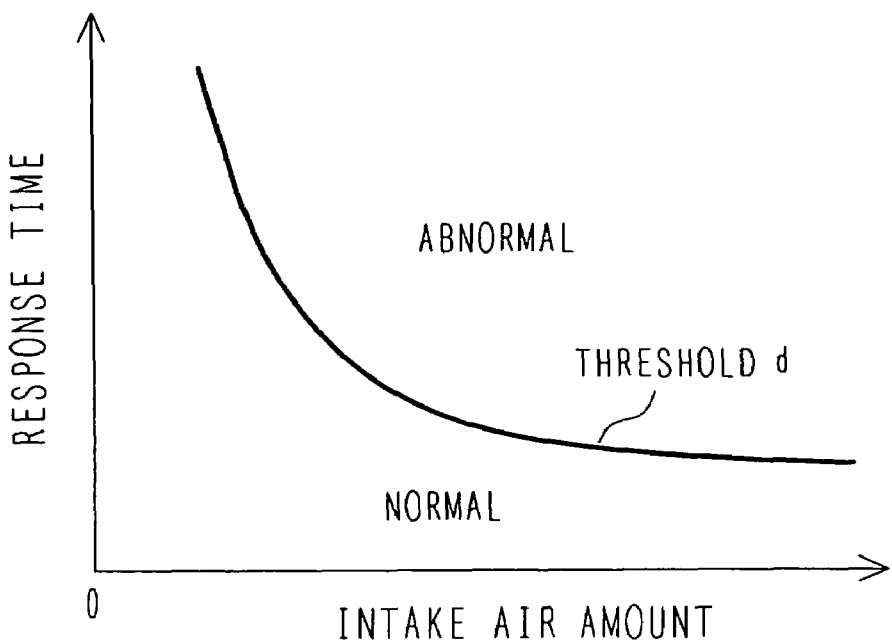
FIG. 24A is a graph showing an example of setting a threshold d for the response time and FIG. 24B is a graph showing an example of setting a threshold e for the fuel modification amount.

FIG. 24A shows an example of setting, for the response time, the threshold d used in step S2302 of the upstream sensor deterioration determining routine shown in FIG. 23. As shown in FIG. 24A, the threshold d for the response time is set to a smaller value as the intake air amount increases. When the response time is longer than the threshold d, this can be determined as indicating that the response of the upstream air-fuel ratio sensor 81 has deteriorated. The reasons why the threshold d is set depending on the intake air amount reside in that a larger intake air amount causes the exhaust gas to strike against the sensor at a higher flow rate, thus resulting in a shorter response time, and that when the intake air amount is large, the engine operation is generally in a high load region and the exhaust gas temperature rises, thus also resulting in a shorter response time.

Figure 24B:
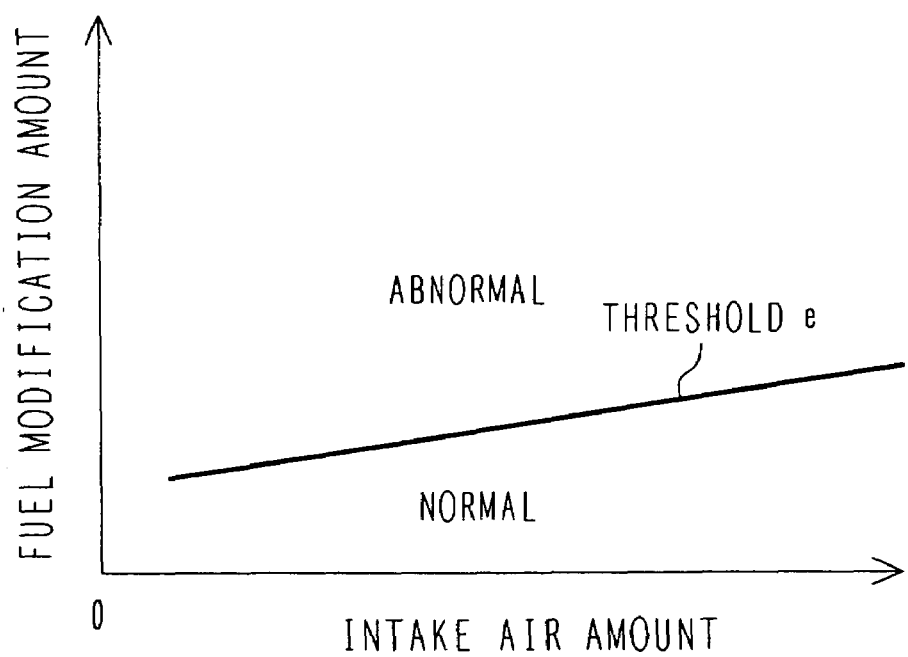

FIG. 24B shows an example of setting, for the fuel modification amount, the threshold e used in step S2304 of the upstream sensor deterioration determining routine shown in FIG. 23. As shown in FIG. 24B, the threshold e is set to a larger value as the intake air amount increases. When the fuel modification amount is larger than the threshold e, this is determined as indicating that the gain of the upstream air-fuel ratio sensor 81 has deteriorated. Also, when the fuel modification amount is smaller than the threshold e, this is determined as indicating that the upstream air-fuel ratio sensor 81 is normal. In other words, if the fuel modification amount modified in the air-fuel ratio feedback control is larger than that in an ordinary state, the upstream air-fuel ratio sensor 81 is determined as being deteriorated.

Figure 25A:
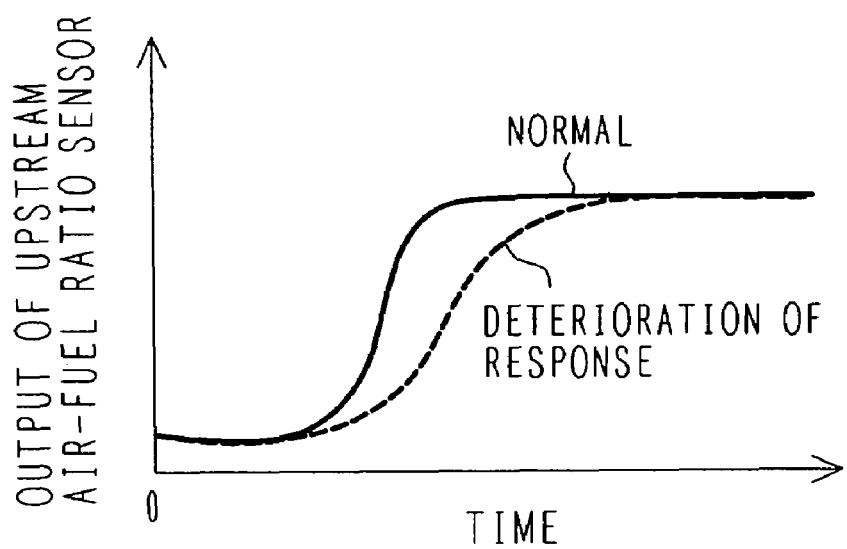
FIGS. 25A and 25B are graphs for explaining the difference between response deterioration (A) and gain deterioration (B)
Figure 25B:
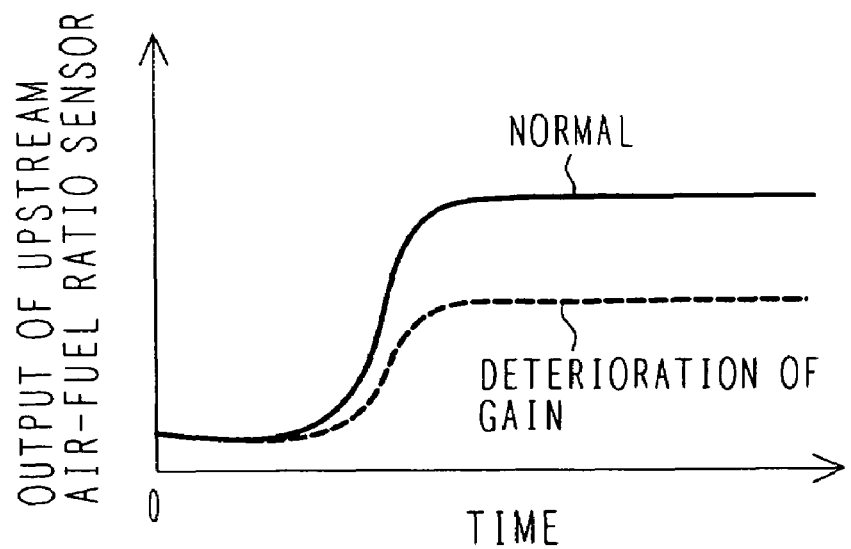

FIGS. 25A and 25B are graphs for explaining the difference between response deterioration (A) and gain deterioration (B), each graph showing the output of the upstream air-fuel ratio sensor 81 when the fuel injection amount is changed without performing the air-fuel ratio feedback control. When the response deterioration occurs, the response is delayed as compared with the normal case, as shown in FIG. 25A. On the other hand, when the gain deterioration occurs, a response width is reduced at the same fuel injection amount as that in the normal case, as shown in FIG. 25B.

Figure 26:
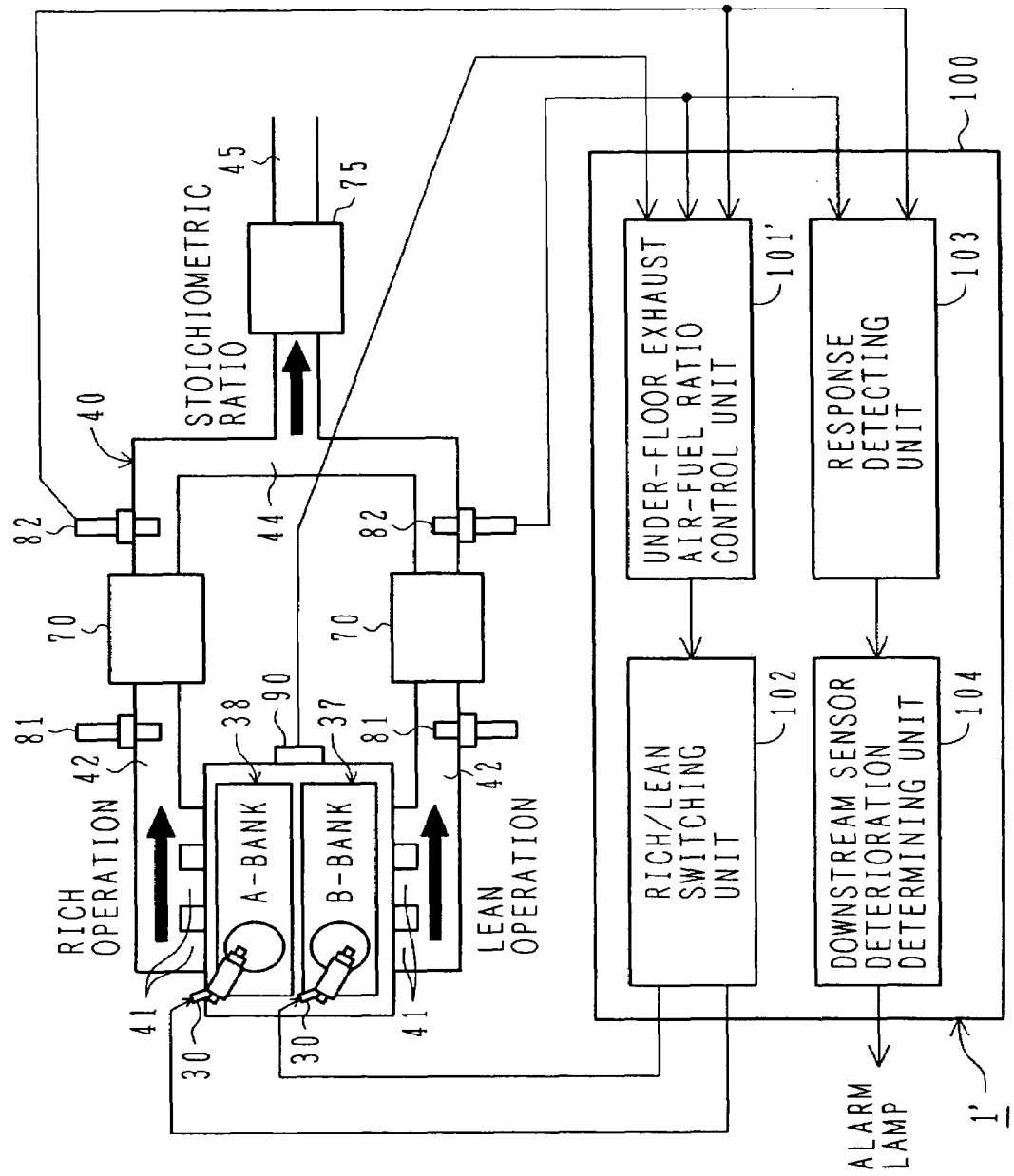
FIG. 26 is a schematic view showing the section of the diagnostic device of the engine exhaust purifying system according to the first embodiment, which takes part in diagnosis of the engine exhaust purifying system, for explaining an example in which a measure for preventing revolution variation is provided in the diagnostic device.

Next, a measure for preventing revolution variation during the above-described diagnosis of the engine exhaust purifying system will be described with reference to FIGS. 26 and 27.

The following description is made of an example in which the measure for preventing revolution variation is applied to the diagnostic device 1 of the engine exhaust purifying system according to the first embodiment. More specifically, this example includes, as shown in FIG. 26, a revolution speed sensor 90 for detecting the revolution speed of the engine 10 (the sensor 90 may be replaced with the crank angle sensor 37 shown in FIG. 1) in addition to the construction shown in FIG. 2. The under-floor exhaust air-fuel ratio control unit 101 takes in an output of the revolution speed sensor 90 and detects a revolution variation based on the sensor output. In accordance with the detected revolution variation, the control unit adjusts the fuel modification amounts in the rich and lean operations, or stops the diagnosis.

Figure 27:
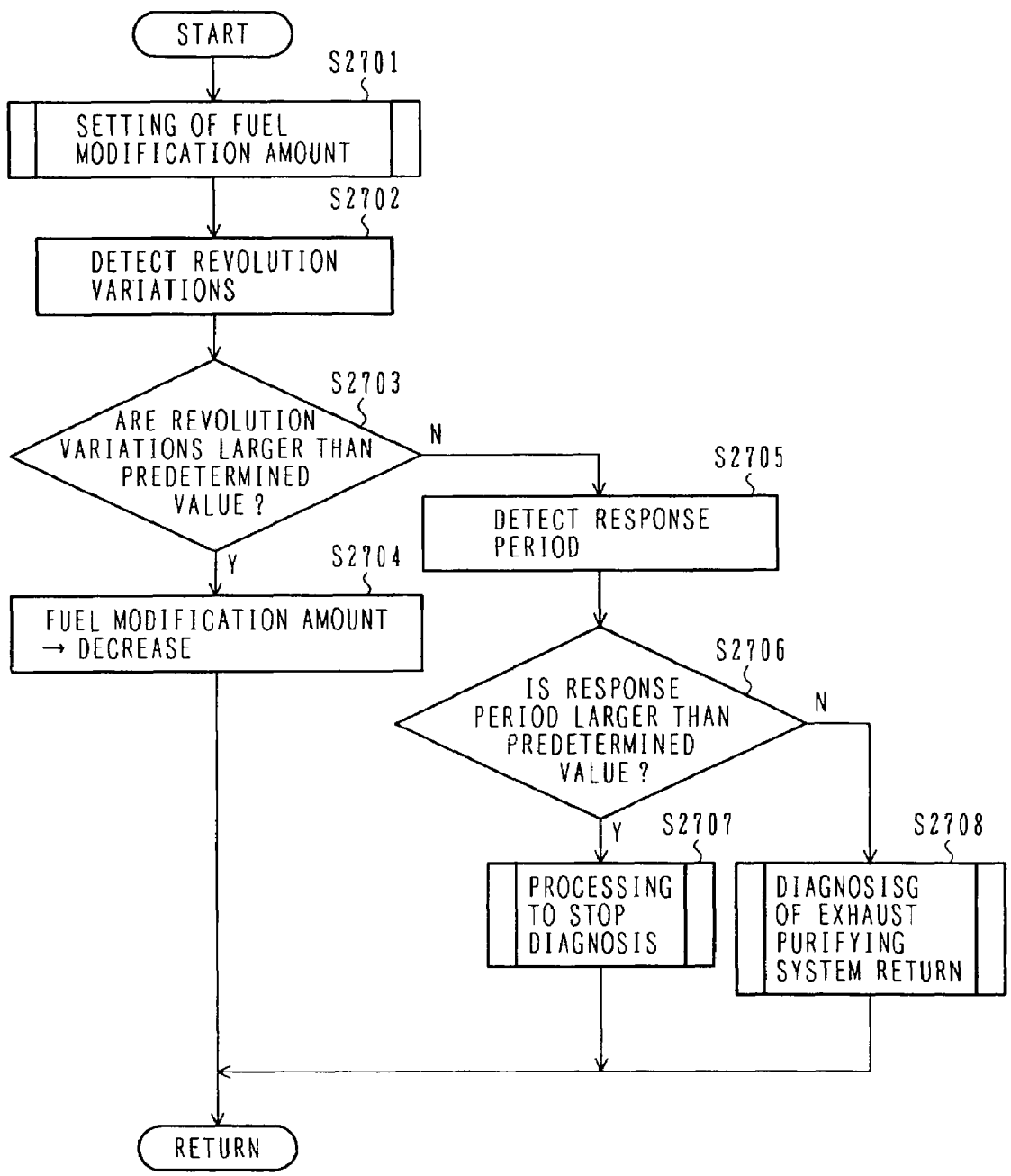
FIG. 27 is a flowchart showing one example of a diagnosis routine including steps to effectuate the measure for preventing revolution variation, which is executed by the control unit.

FIG. 27 is a flowchart showing one example of a diagnosis routine including steps to effectuate the measure for preventing revolution variation, which is executed by the control unit 100. In this routine, the fuel modification amount used in switching to the rich or lean operation is set in step S2701. Then, in step S2702, a revolution variation is detected based on the output of the revolution speed sensor 90. It is determined in step S2703 whether the detected revolution variation is larger than a predetermined value. If the detected revolution variation is larger than the predetermined value, the control flow proceeds to step S2704, and if not so, the control flow proceeds to step S2705.

For the purpose of suppressing the revolution variation, in step S2704, the fuel modification amount is set to a value smaller than that set in step S2701. On the other hand, the response period is detected in step S2705. If it is determined in step S2706 that the response period is larger than a predetermined value, the control flow proceeds to step S2707 in which the diagnosis is temporarily stopped. Thus, the deterioration determination is not executed. If the response period is shorter than the predetermined value, the control flow proceeds to step S2708 in which the diagnosis of the engine exhaust purifying system is performed. By executing this routine, the revolution variation occurred during the diagnosis can be suppressed. In addition, since the diagnosis is temporarily stopped when the response period is larger than the predetermined value, it is possible to increase the diagnosis accuracy.

What is claimed is:

1. A diagnostic device of an engine exhaust purifying system including a plurality of cylinder groups, a pre-catalyst made of a three-way catalyst and disposed in each of a plurality of upstream-side exhaust passage portions connected to the respective cylinder groups, a downstream air-fuel ratio sensor disposed downstream of each said pre-catalyst, and a main catalyst made of a three-way catalyst and disposed in a downstream-side exhaust passage portion downstream of a merging area where said upstream-side exhaust passage portions are merged together, said diagnostic device comprising:

exhaust air-fuel ratio control means for performing control to keep an air-fuel ratio of exhaust gas flowing into said main catalyst near a stoichiometric ratio in accordance with outputs of said downstream air-fuel ratio sensors;

rich/lean switching means for switching over the air-fuel ratio in each said cylinder group from rich to lean in accordance with information obtained from said exhaust air-fuel ratio control means, thereby diagnosing said downstream air-fuel ratio sensor;

response detecting means for detecting a response of said downstream air-fuel ratio sensor when the rich/lean switching of the air-fuel ratio in each cylinder group is performed; and downstream sensor deterioration determining means for determining a deterioration of said downstream air-fuel ratio sensor based on the detected response, wherein said diagnostic device is configured such that, upon starting of diagnosis, the cylinder groups are temporarily changed to one of rich or lean and thereafter by way of the rich/lean switching means, one of the cylinder groups is switched from one of rich to lean or lean to rich and then another of the cylinder groups is likewise switched from one of rich to lean or lean to rich, such alternating switching routine occurring repeatedly with a sum of fuel modification amounts being kept at zero and under-floor exhaust gas is maintained nearly at the stoichiometric ratio.

2. The diagnostic device of an engine exhaust purifying system according to claim 1, further comprising, an upstream air-fuel ratio sensor disposed upstream of each said pre-catalyst, and upstream sensor deterioration determining means for determining a deterioration of said upstream air-fuel ratio sensor based on the detected response or related information.

3. The diagnostic device of the engine exhaust purifying system according to claim 2, wherein said response detecting means detects at least one of a response time required for an output of said upstream air-fuel ratio sensor to change from a first predetermined value to a second predetermined value and a response time required for said output to change from the second predetermined value to the first predetermined value.

4. The diagnostic device of the engine exhaust purifying system according to claim 3, wherein said upstream sensor deterioration determining means determines that said upstream air-fuel ratio sensor has deteriorated, when the detected response time is not smaller than a predetermined value set depending on engine operating status.

5. The diagnostic device of the engine exhaust purifying system according to claim 2, wherein said rich/lean switching means performs air-fuel ratio feedback control in accordance with an output of said upstream air-fuel ratio sensor, and said upstream sensor deterioration determining means determines that said upstream air-fuel ratio sensor has deteriorated, when a fuel modification amount during the rich/lean switching operation is not smaller than a predetermined value set depending on engine operating status.

6. The diagnostic device of the engine exhaust purifying system according to claim 1, wherein said exhaust air-fuel ratio control means performs the air-fuel ratio control for each said cylinder group such that the output of at least one of said downstream air-fuel ratio sensors becomes rich.

7. The diagnostic device of the engine exhaust purifying system according to claim 6, wherein said exhaust air-fuel ratio control means controls the air-fuel ratios in all said cylinder groups to be temporarily rich at the start of diagnosis.

8. The diagnostic device of the engine exhaust purifying system according to claim 1, wherein said exhaust air-fuel ratio control means performs the air-fuel ratio control for each said cylinder group such that the output of at least one of said downstream air-fuel ratio sensors becomes lean.

9. The diagnostic device of the engine exhaust purifying system according to claim 8, wherein said exhaust air-fuel ratio control means controls the air-fuel ratios in all said cylinder groups to be temporarily lean at the start of diagnosis.

10. The diagnostic device of the engine exhaust purifying system according to claim 1, wherein said rich/lean switching means switches over the air-fuel ratio in each said cylinder group to be rich or lean such that the output of said downstream air-fuel ratio sensor changes in excess of a predetermined value.

11. The diagnostic device of the engine exhaust purifying system according to claim 10, wherein said rich/lean switching means modifies a fuel injection amount such that a response period from a point in time at which the output of said downstream air-fuel ratio sensor exceeds a predetermined value to a point in time at which said output exceeds the predetermined value again is held substantially at a predetermined time value.

12. The diagnostic device of the engine exhaust purifying system according to claim 11, wherein said pre-catalyst deterioration determining means determines that said pre-catalyst has deteriorated, when a modification amount of the fuel injection amount as information related to the response period is not larger than a predetermined value set depending on engine operating status.

13. The diagnostic device of the engine exhaust purifying system according to claim 10, wherein said rich/lean switching means modifies a fuel injection amount such that a difference between the rich and lean air-fuel ratios in each said cylinder group falls within a predetermined range.

14. The diagnostic device of the engine exhaust purifying system according to claim 1, wherein said response detecting means detects a response time required for the output of said downstream air-fuel ratio sensor to change from a first predetermined value to a second predetermined value and a response time for said output to change from the second predetermined value to the first predetermined value.

15. The diagnostic device of the engine exhaust purifying system according to claim 14, wherein said downstream sensor deterioration determining means determines that said downstream air-fuel ratio sensor has deteriorated, when the detected response time is not smaller than a predetermined value set depending on engine operating status.

16. The diagnostic device of the engine exhaust purifying system according to claim 14, wherein the deterioration determination is stopped when the response time or the response period is longer than a predetermined value.

17. The diagnostic device of the engine exhaust purifying system according to claim 1, further comprising revolution variation detecting means, wherein said rich/lean switching means reduces a difference between rich and lean air-fuel ratios when the revolution variation detected by said revolution variation detecting means is not smaller than a predetermined value.

18. A diagnostic device of an engine exhaust purifying system including a plurality of cylinder groups, a pre-catalyst made of a three-way catalyst and disposed in each of a plurality of upstream-side exhaust passage portions connected to the respective cylinder groups, a downstream air-fuel ratio sensor disposed downstream of each said pre-catalyst, and a main catalyst made of a three-way catalyst and disposed in a downstream-side exhaust passage portion downstream of a merging area where said upstream-side exhaust passage portions are merged together, said diagnostic device comprising:
    exhaust air-fuel ratio control means for performing control to keep an air-fuel ratio of exhaust gas flowing into said main catalyst near a stoichiometric ratio in accordance with outputs of said downstream air-fuel ratio sensors;
    rich/lean switching means for switching over the air-fuel ratio in each said cylinder group from rich to lean in accordance with information obtained from said exhaust air-fuel ratio control means, thereby diagnosing said pre-catalyst;
    response period detecting means for detecting a response period of said downstream air-fuel ratio sensor or information related to the response period when the rich/lean switching of the air-fuel ratio in each said cylinder group is performed; and
    pre-catalyst deterioration determining means for determining a deterioration of said pre-catalyst based on the detected response period or related information,
    wherein said diagnostic device is configured such that, upon starting of diagnosis, the cylinder groups are temporarily changed to one of rich or lean and thereafter by way of the rich/lean switching means, one of the cylinder groups is switched from one of rich to lean or lean to rich and then another of the cylinder groups is likewise switched from one of rich to lean or lean to rich, such alternating switching routine occurring repeatedly with a sum of fuel modification amounts being kept at zero and under-floor exhaust gas is maintained nearly at the stoichiometric ratio.

19. The diagnostic device of the engine exhaust purifying system according to claim 18, wherein said response period detecting means detects a response period from a point in time at which the output of said downstream air-fuel ratio sensor exceeds a predetermined value to a point in time at which said output exceeds the predetermined value again.

20. The diagnostic device of the engine exhaust purifying system according to claim 19, wherein said pre-catalyst deterioration determining means determines that said pre-catalyst has deteriorated, when the detected response period is not larger than a predetermined value set depending on engine operating status.

21. The diagnostic device of the engine exhaust purifying system according to claim 19, wherein said pre-catalyst deterioration determining means determines that said pre-catalyst has deteriorated, when a modified response period resulting by excluding the response time of said downstream air-fuel ratio sensor from the detected response period is not larger than a predetermined value set depending on engine operating status.

22. A diagnostic method of an engine exhaust purifying system including a plurality of cylinder groups, a pre-catalyst made of a three-way catalyst and disposed in each of a plurality of upstream-side exhaust passage portions connected to the respective cylinder groups, a downstream air-fuel ratio sensor disposed downstream of each said pre-catalyst, and a main catalyst made of a three-way catalyst and disposed in a downstream-side exhaust passage portion downstream of a merging area where said upstream-side exhaust passage portions are merged together, said diagnostic method comprising the steps of, in diagnosis of each said downstream air-fuel ratio sensor:
    performing air-fuel ratio control to keep an air-fuel ratio of exhaust gas flowing into said main catalyst near a stoichiometric ratio in accordance with outputs of said downstream air-fuel ratio sensors;
    switching over the air-fuel ratio in each said cylinder group from rich to lean in accordance with information obtained from the air-fuel ratio control, thereby detecting a response of said downstream air-fuel ratio sensor; and
    determining a deterioration of said downstream air-fuel ratio sensor based on the detected response,
    wherein, upon starting of diagnosis, the cylinder groups are temporarily changed to one of rich or lean and thereafter one of the cylinder groups is switched from one of rich to lean or lean to rich and then another of the cylinder groups is likewise switched from one of rich to lean or lean to rich, such alternating switching routine occurring repeatedly with a sum of fuel modification amounts being kept at zero and under-floor exhaust gas is maintained near the stoichiometric ratio.

23. The diagnostic method of an engine exhaust purifying system according to claim 22, wherein an upstream air-fuel ratio is disposed upstream of each said pre-catalyst, said diagnostic method further comprising, in diagnosing each said upstream air-fuel ratio sensor,
    performing air-fuel ratio control to k and
    determining a deterioration of said upstream air-fuel ratio sensor based on the detected response or related information.

24. A diagnostic method of an engine exhaust purifying system including a plurality of cylinder groups, a pre-catalyst made of a three-way catalyst and disposed in each of a plurality of upstream-side exhaust passage portions connected to the respective cylinder groups, a downstream air-fuel ratio sensor disposed downstream of each said pre-catalyst, and a main catalyst made of a three-way catalyst and disposed in a downstream-side exhaust passage portion downstream of a merging area where said up stream-side exhaust passage portions are merged together, said diagnostic method comprising the steps of, in diagnosis of each said pre-catalyst:
    performing air-fuel ratio control to keep an air-fuel ratio of exhaust gas flowing into said main catalyst near a stoichiometric ratio in accordance with outputs of said downstream air-fuel ratio sensors;
    switching over the air-fuel ratio in each said cylinder group from rich to lean in accordance with information obtained from the air-fuel ratio control, thereby detecting a response period of said downstream air-fuel ratio sensor or information related to the response period; and determining a deterioration of said pre-catalyst based on the detected response or related information, wherein, upon starting of diagnosis, the cylinder groups are temporarily changed to one of rich or lean and thereafter one of the cylinder groups is switched from one of rich to lean or lean to rich and then another of the cylinder groups is likewise switched from one of rich to lean or lean to rich, such alternating switching routine occurring repeatedly with a sum of fuel modification amounts being kept at zero and under-floor exhaust gas is maintained near the stoichiometric ratio.

* * * * *